United States Patent
Zeng et al.

(10) Patent No.: US 12,541,287 B2
(45) Date of Patent: Feb. 3, 2026

(54) INTEGRATED ENERGY DATA SCIENCE PLATFORM

(71) Applicant: Schlumberger Technology Corporation, Sugar Land, TX (US)

(72) Inventors: Yongdong Zeng, Houston, TX (US); Babu Sai Sampath Reddy Vinta, Houston, TX (US); Charu Hans, Houston, TX (US); Lan Lu, Houston, TX (US); Yun Ma, Houston, TX (US); Aaron Perozo, Houston, TX (US)

(73) Assignee: Schlumberger Technology Corporation, Sugar Land, TX (US)

(*) Notice: Subject to any disclaimer, the term of this patent is extended or adjusted under 35 U.S.C. 154(b) by 86 days.

(21) Appl. No.: 18/553,223

(22) PCT Filed: Mar. 30, 2022

(86) PCT No.: PCT/US2022/022443
§ 371 (c)(1),
(2) Date: Sep. 29, 2023

(87) PCT Pub. No.: WO2022/212438
PCT Pub. Date: Oct. 6, 2022

(65) Prior Publication Data
US 2024/0184416 A1  Jun. 6, 2024

Related U.S. Application Data

(60) Provisional application No. 63/168,201, filed on Mar. 30, 2021, provisional application No. 63/168,198, (Continued)

(51) Int. Cl.
*G06F 3/0484* (2022.01)
*G06F 3/04817* (2022.01)
(Continued)

(52) U.S. Cl.
CPC ........ *G06F 3/0484* (2013.01); *G06F 3/04817* (2013.01); *G06F 3/0482* (2013.01); *G06F 9/451* (2018.02); *G06F 16/29* (2019.01)

(58) Field of Classification Search
None
See application file for complete search history.

(56) References Cited

U.S. PATENT DOCUMENTS 9,354,776 B1   5/2016  Subramanian
9,891,808 B2 * 2/2018  Wilson .................... G06F 16/14
(Continued)

FOREIGN PATENT DOCUMENTS

WO   2020010251 A1   1/2020
WO   2020181027 A1   9/2020

OTHER PUBLICATIONS

Chen, A. et al., "Developments in MLflow: A System to Accelerate the Machine Learning Lifecycle", 2020 in Proceedings of the Fourth International Workshop on Data Management for End-to-End Machine Learning (pp. 1-4).

(Continued)

*Primary Examiner* — Linda Huynh
(74) *Attorney, Agent, or Firm* — Jeffrey D. Frantz

(57) ABSTRACT

A method implements an integrated energy data science platform. The method includes presenting a data discovery component, including a map view to select data using the map view. The method further includes presenting a model selection component to select a machine learning model configured with deployment settings and configured to use the data, wherein the deployment settings identify sample features of the data. The method further includes authorizing access to the machine learning model and the data, deploying the machine learning model using the deployment settings, and presenting results generated from the sample (Continued)

features using the machine learning model, wherein the sample features are extracted from the data.

20 Claims, 16 Drawing Sheets

Related U.S. Application Data filed on Mar. 30, 2021, provisional application No. 63/168,200, filed on Mar. 30, 2021.

(51) Int. Cl.
*G06F 3/0482* (2013.01)
*G06F 9/451* (2018.01)
*G06F 16/29* (2019.01)

(56) References Cited

U.S. PATENT DOCUMENTS

| | | | |
|---|---|---|---|
| 10,452,913 B1* | 10/2019 | Cervelli | G06T 7/20 |
| 10,817,530 B2 | 10/2020 | Siebel | |
| 11,409,756 B1 | 8/2022 | Park | |
| 11,599,813 B1* | 3/2023 | Yuan | G06N 20/00 |
| 2009/0106178 A1 | 4/2009 | Chu | |
| 2009/0284530 A1 | 11/2009 | Lester | |
| 2010/0185984 A1 | 7/2010 | Wright | |
| 2014/0156806 A1 | 6/2014 | Karpistsenko | |
| 2014/0310633 A1 | 10/2014 | Mclellan | |
| 2016/0210270 A1 | 7/2016 | Kelly | |
| 2016/0274781 A1 | 9/2016 | Wilson | |
| 2017/0091673 A1* | 3/2017 | Gupta | G06N 5/022 |
| 2017/0178020 A1* | 6/2017 | Duggan | G06F 16/22 |
| 2017/0193392 A1 | 7/2017 | Liu | |
| 2017/0316114 A1* | 11/2017 | Bourhani | G06F 30/00 |
| 2018/0307391 A1 | 10/2018 | Bogomolov | |
| 2018/0349413 A1 | 12/2018 | Shelby | |
| 2019/0066133 A1 | 2/2019 | Cotton | |
| 2019/0147297 A1 | 5/2019 | Rogers | |
| 2019/0171428 A1 | 6/2019 | Patton | |
| 2020/0012962 A1* | 1/2020 | Dent | G06N 20/00 |
| 2020/0019882 A1* | 1/2020 | Garg | G06F 21/6218 |
| 2020/0040719 A1* | 2/2020 | Maniar | E21B 41/00 |
| 2020/0250394 A1* | 8/2020 | Cervelli | G06F 18/24 |
| 2020/0327969 A1 | 10/2020 | Malvankar | |
| 2020/0380056 A1 | 12/2020 | Morris et al. | |
| 2022/0300850 A1* | 9/2022 | Mendez | G06F 8/34 |
| 2024/0176469 A1 | 5/2024 | Zeng | |
| 2024/0176732 A1 | 5/2024 | Hans | |
| 2024/0295954 A1* | 9/2024 | Stoller | A01C 7/105 |

OTHER PUBLICATIONS

"What is Amazon SageMaker ASageMaker AI", downloaded from the Internet on Dec. 25, 2024 from [https://docs.aws.amazon.com/sagemaker/latest/dg/whatis.html], 7 pages.

Dataiku Key Capabilities, downloaded from the Internet on Dec. 25, 2024 from [https://www.dataiku.com/product/key-capabilities/] 6 pages.

Hall, D.G. et al., "Users Guide Virtual Hydropower Prospector Version 1.1", Idaho National Laboratory, 2005, downloaded from the internet on Dec. 24, 2024 from [https://inldigitallibrary.inl.gov/sites/sti/sti/3488130.pdf], 38 pages.

Jing, C. et al., "Geospatial Dashboards for Monitoring Smart City Performance", Sustainability, 2019, 11(20), downloaded from the internet on Dec. 25, 2024 from [https://www.mdpi.com/2071-1050/11/20/5648/pdf], 23 pages.

Xu, H., "Development of a digitalization tool for linking thematic data to a background map", Lund University GEM thesis series nr 25, published 2017, downloaded from the internet on Dec. 25, 2024 from [https://lup.lub.lu.se/luur/downloadfunc=downloadFile recordOld=8919462 fileOld=8919470], 54 pages.

Agrawal, A. et al., "Cloudy with High Chance of Dbms: A 10-year Prediction for Enterprise-Grade ML", arXiv:1909.00084v2, Dec. 27, 2019, 8 pages.

Ames, D. P. et al., "HydroDesktop: Web services based software for hydrologic data discovery, download, visualization, and analysis", Environmental Modelling Software 37, pp. 146-156.

Zhou, L. et al., "Transfer Fuction Design based on User Selected Samples for Intuitive Multivariate Volume Exploration", IEEE Pacific Visualization Simposium, 2013, 7 pages.

Yang, W. et al., "Diagnosing Concept Drift with Visual Analytics", arXiv:2007.14372v3, Sep. 15, 2020, 12 pages.

Cashman, D. et al., "A User-based Visual Analytics Workflow for Exploratory Model Analysis", arXiv:1809.10782v3, Jul. 29, 2019, 15 pages.

Albinhassan, N. M. et al., "Porosity prediction using the group method of data handling", Geophysics, 2011, 76(5), 8 pages.

Search Report and Written Opinion of International Patent Application No. PCT/US2022/022451 dated Jun. 2, 2022, 10 pages.

Search Report and Written Opinion of International Patent Application No. PCT/US2022/022443 dated May 12, 2022, 10 pages.

Search Report and Written Opinion of International Patent Application No. PCT/US2022/022458 dated May 24, 2022, 11 pages.

Extended Search Report issued in European Patent Application No. 22782063.6 dated Jan. 8, 2025, 7 pages.

Extended Search Report issued in European Patent Application No. 22782061.0 dated Feb. 13, 2025, 7 pages.

Extended Search Report issued in European Patent Application No. 22782064.4 dated Feb. 14, 2025, 6 pages.

* cited by examiner

Deploy Model

Deployment Name*
Deployment Name  1152

Description
Create a Short Description  1155

---

Replicas
1  1158
Number of pod replicas in kubernetes
CPU
400  1160    CPU Limit
              500  1162
CPU request for containers in thousandth of a
core (500 - 50% of a core, 1000 - 1 cores)
Memory
400  1165    Memory Unit
              500  1168
Memory request for containers in megabytes

---

Sample Features
{
 "height": 5,
 "area": .85
}  1170 xxxxxxx xxxxxxxxxx xxxxxxxxx

1150

Cancel    Deploy

FIG. 11.3

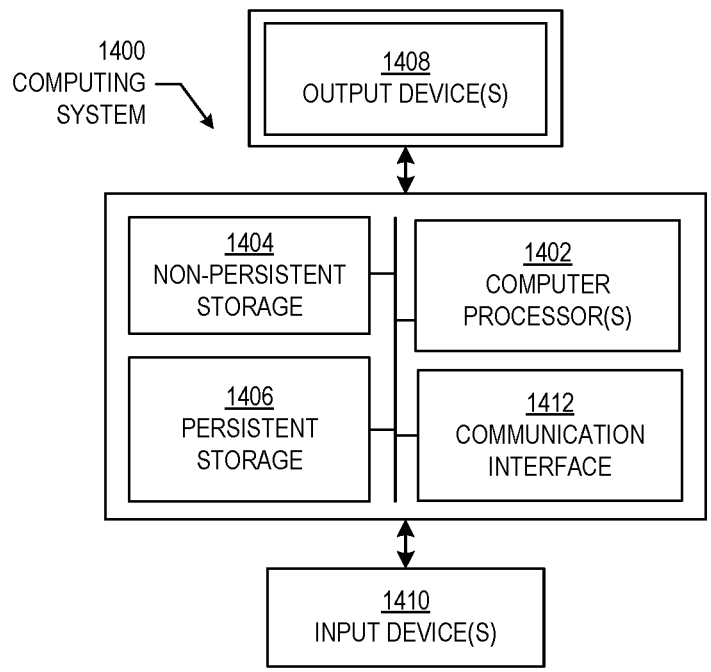
FIG. 14.1
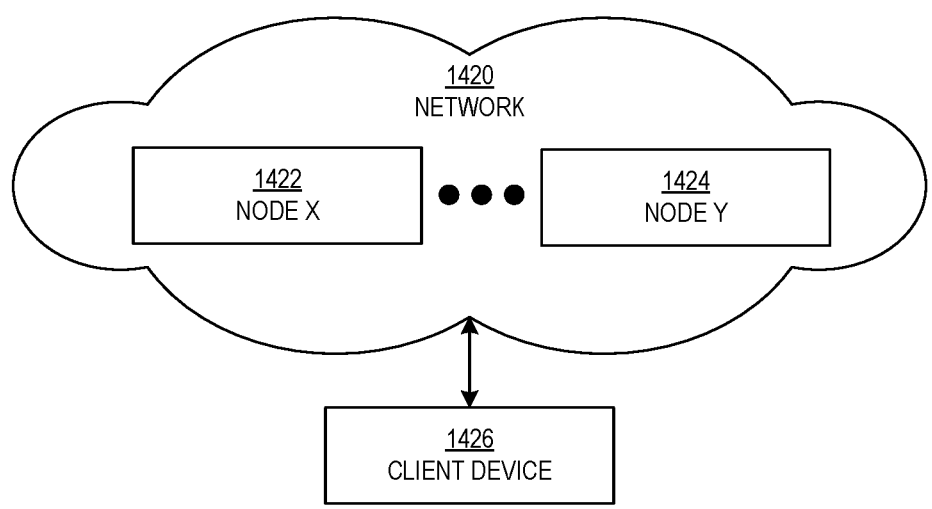
FIG. 14.2

INTEGRATED ENERGY DATA SCIENCE PLATFORM

CROSS REFERENCE TO RELATED APPLICATIONS

This application is a National Stage Entry of International Application No. PCT/US2022/022443, filed Mar. 30, 2022, which claims the benefit of U.S. Provisional Application 63/168,198, filed Mar. 30, 2021, of U.S. Provisional Application 63/168,200, filed Mar. 30, 2021, and of U.S. Provisional Application 63/168,201, filed Mar. 30, 2021, the entirety of which are incorporated herein by reference. This application is related to International Application No. PCT/US2022/022451 titled "ADVANCED DATA DISCOVERY AND VISUALIZATION FOR ENERGY DATA SOURCES", which claims the benefit of US Provisional Application 63/168,198, filed Mar. 30, 2021, of U.S. Provisional Application 63/168,200, filed Mar. 30, 2021, and of U.S. Provisional Application 63/168,201, filed Mar. 30, 2021. This application is related to International Application No PCT/US2022/022458 titled "ADVANCED APPLICATION OF MODEL OPERATIONS IN ENERGY", which claims the benefit of U.S. Provisional Application 63/168,198, filed Mar. 30, 2021, of U.S. Provisional Application 63/168,200, filed Mar. 30, 2021, and of U.S. Provisional Application 63/168,201, filed Mar. 30, 2021. Each of the applications above are incorporated herein by reference.

BACKGROUND

Artificial intelligence (AI) is being applied to multiple industries. A challenge for using energy data is developing a platform containing an integrated, fit for purpose, set of tools that sifts the big data associated with energy data workflows and then transform the data into insights for decision making relevant for the energy industry. The energy industry uses data and processes where the data extracted through present tools are subsurface information relying on indirect measurements. The science in the industry uses human experience and similar physical processes happening elsewhere in the world, in the past or the present. As Charles Lyell famously said "Present is the key to the Past" which describes an understanding of some of the energy sources formed millions of years back through the experience of present physical processes. A challenge is to leverage machine learning to automate and drive efficiency in the workflows by reducing time consuming and monotonous human intensive tasks.

SUMMARY

In general, in one or more aspects, the disclosure relates to a method that implements an integrated energy data science platform. The method includes presenting a data discovery component, including a map view to select data using the map view. The method further includes presenting a model selection component to select a machine learning model configured with deployment settings and configured to use the data, wherein the deployment settings identify sample features of the data. The method further includes authorizing access to the machine learning model and the data, deploying the machine learning model using the deployment settings, and presenting results generated from the sample features using the machine learning model, wherein the sample features are extracted from the data.

Other aspects of the invention will be apparent from the following description and the appended claims.

BRIEF DESCRIPTION OF DRAWINGS

FIG. 5, FIG. 6, FIG. 7, FIG. 8, FIG. 9, FIG. 10, FIG. 11.1, FIG. 11.2, FIG. 11.3.

FIG. 14.1 and FIG. 14.2 show computing systems in accordance with disclosed embodiments.

DETAILED DESCRIPTION

Figure 1:
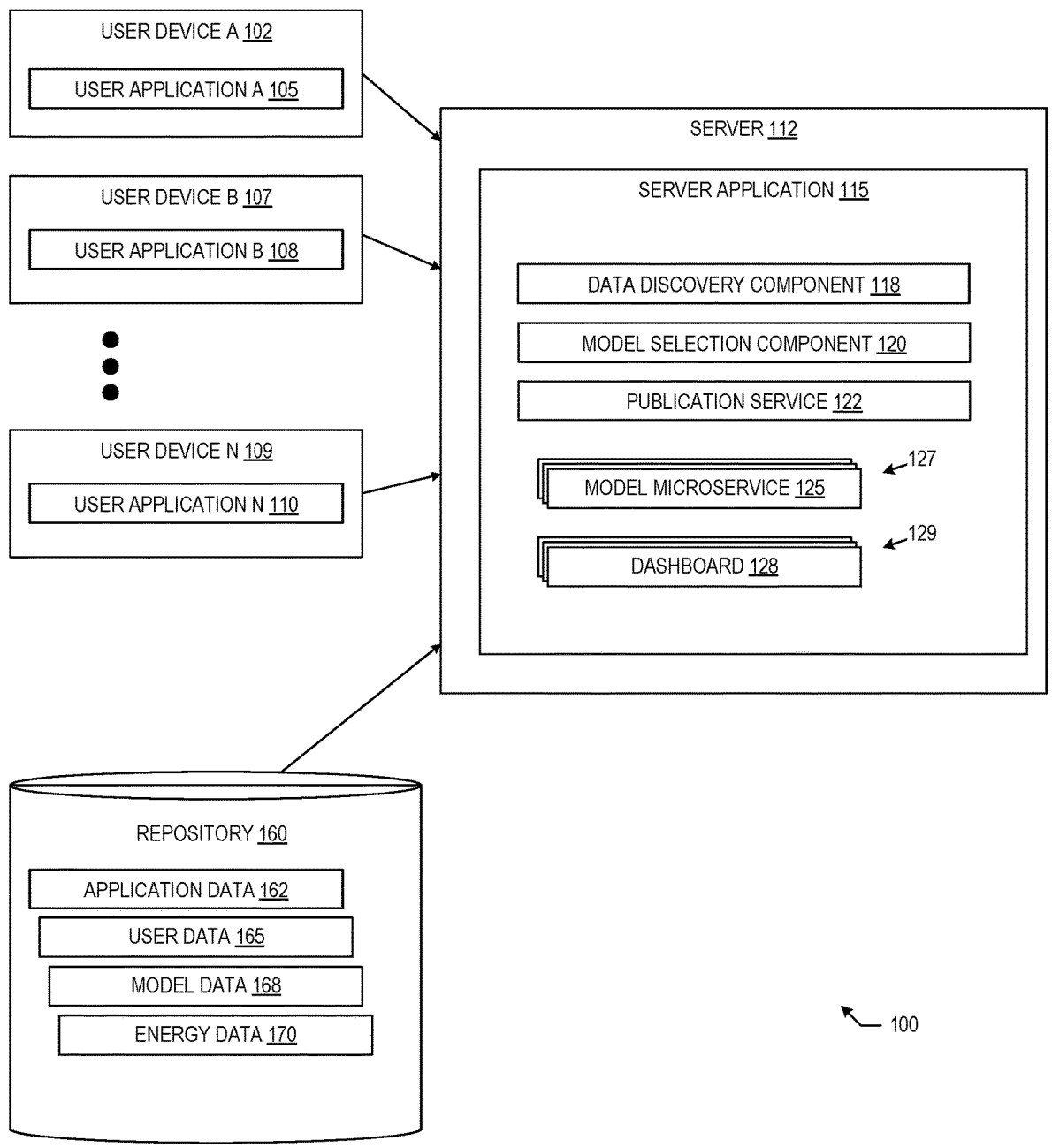
FIG. 1, FIG. 2, and FIG. 3 show systems and components in accordance with disclosed embodiments.

Specific embodiments will now be described in detail with reference to the accompanying figures. Like elements in the various figures are denoted by like reference numerals for consistency.

In the following detailed description of embodiments of the technology, numerous specific details are set forth in order to provide a more thorough understanding. However, it will be apparent to one of ordinary skill in the art that various embodiments may be practiced without these specific details. In other instances, well-known features have not been described in detail to avoid unnecessarily complicating the description.

Embodiments of the disclosure implement a integrated energy data science platform. The platform is implemented with computing systems that handle requests of energy specific workflows and present visualizations. Systems of the disclosure include an AI suite that includes energy data specific viewers to analyze and view the subsurface data and integrate physical modeling with machine learning and post machine learning workflows to offer a complete end to end solution.

Visualization with business intelligence (BI) tools (e.g., Spotfire, Tableau and POWER BI) allows for analyzing and visualizing various datasets. Users can connect to different datasets using data connectors and use various graphical, plotting and statistics tools to visualize and analyze the data. Although these BI tools provide excellent platforms for users to gain insight into data, the BI tools may lack the capability to discover data through integrated geospatial and data specific visualization. Embodiments of the disclosed platform provides the capability to determine the best visualizations tools based one each kind of data via a machine learning algorithm.

Despite a rich set of software available for data visualization, and data science, it is a challenge to find an integrated and cohesive platform for data discovery, data visualization and data science. Embodiments of the disclosed platform provide various components, tools and user interfaces (UIs) to enable integration between business intelligence (BI), physical modeling workflows, rule-based workflows and data science workflows. Embodiments of the disclosed platform enable an end user to design a workflow by discovering data using automated data specific visualization, and selecting relevant data and applying various aggregation, cleansing to further process the data using data science tools. The data may be written back to various data sources acting as a feature store. The platform enables an end user and applications to train and serve and monitor the models.

Embodiments of the disclosure provide applications to view data and develop, deploy, and use machine learning models. A user may access the viewers to identify data and automatically import the data into a workspace for a data analysis project to develop a machine learning model. After the workspace is created, the user may develop, train, and test machine learning models. After developing a machine learning model, the user may publish the machine learning model to be used by other processes and users. After publishing the machine learning model, other processes and users may access the machine learning model to analyze energy data and build predictions.

The figures show diagrams of embodiments that are in accordance with the disclosure. The embodiments of the figures may be combined and may include or be included within the features and embodiments described in the other figures of the application. The features and elements of the figures are, individually and as a combination, improvements to the technology of data exploration and machine learning model development and deployment. The various elements, systems, components, and steps shown in the figures may be omitted, repeated, combined, and/or altered as shown from the figures. Accordingly, the scope of the present disclosure should not be considered limited to the specific arrangements shown in the figures.

Turning to FIG. 1, the system (100) implements an integrated energy data science platform. Users operate the user devices A (102), B (107), and N (109) to access applications, websites, services, etc., that may be hosted by the server (112). The server (112) hosts a platform that allows users, who are not data scientists, to develop, publish, and use machine learning models for data analysis projects. In one embodiment, the data analysis projects include machine learning models that analyze the data located by the user. The system (100) includes the user devices A (102), B (107), and N (109), the server (112), and the repository (160).

The server (112) is a computing system (further described in FIG. 14.1). The server (112) may include multiple physical and virtual computing systems that form part of a cloud computing environment. In one embodiment, execution of the programs and applications of the server (112) is distributed to multiple physical and virtual computing systems in the cloud computing environment. The server (112) includes the server application (115).

The server application (115) is a collection of programs that may execute on multiple servers of a cloud environment, including the server (112). The server application (115) includes the data discovery component (118), the model selection component (120), the publication service (122), the model microservices (127), and the dashboards (129). In one embodiment, the server application (115) may host applications, programs, and components accessed by users of the user devices A (102) through N (109). The applications hosted by the server application (115) may serve structured documents (hypertext markup language (HTML) pages, extensible markup language (XML) pages, JavaScript object notation (JSON) files and messages, etc.).

The data discovery component (118) is a set of programs used to discover data for machine learning models. The discovery is performed by the server (112) by presenting views of data to the user devices A (102), B (107), and N (109) and receiving user selections of the data from the user devices A (102), B (107), and N (109). An embodiment of the data discovery component (118) is further described in FIG. 2.

The model selection component (120) is a set of programs used to select machine learning models for data analysis projects. Selection is performed by interactions between the server (112) and the user devices A (102), B (107), and N (109). An embodiment of the model selection component (120) is further described in FIG. 3.

The publication service (122) is a set of programs used to publish machine learning models to be used by other processes of the system (100). Publication is performed by interactions between the server (112) and the user devices A (102), B (107), and N (109). The publication service (122) may automatically publish machine learning models based on selections and settings for the machine learning models perceived from the user devices A (102), B (107), and N (109).

The model microservices (127), including the model microservice (125), are microservices used to access machine learning models that have been published through the publication service (122). One data analysis project may have one machine learning model that is hosted by multiple model microservices. A process that uses a machine learning model to analyze data may correspond to one model microservice of the model microservices (127).

The dashboards (129), including the dashboard (128), present information generated by the system (100) to the user devices A (102), B (107), and N (109). For example, the dashboard (128) may show information generated by the machine learning model accessed with the model microservice (125), published by the publication service (122), selected with the model selection component (120), and for which the data used was selected with the data discovery component (118).

The user devices A (102) and B (107) through N (109) are computing systems (further described in FIG. 14.1). For example, the user devices A (102) and B (107) through N (109) may be desktop computers, mobile devices, laptop computers, tablet computers, server computers, etc. The user devices A (102) and B (107) through N (109) include hardware components and software components that operate as part of the system (100). The user devices A (102) and B (107) through N (109) communicate with the server (112) to access and manipulate information, including the application data (162), the user data (165), the model data (168), and the energy data (170).

In one embodiment, the user devices A (102) and B (107) through N (109) may communicate with the server (112) using standard protocols and file types, which may include hypertext transfer protocol (HTTP), HTTP secure (HTTPS), transmission control protocol (TCP), internet protocol (IP), hypertext markup language (HTML), extensible markup language (XML), etc. The user devices A (102) and B (107) through N (109) respectively include the user applications A (105) and B (108) through N (110).

The user applications A (105) and B (108) through N (110) may each include multiple programs respectively running on the user devices A (102) and B (107) through N (109). The user applications A (105) and B (108) through N (110) may be native applications, web applications, embedded applications, etc. In one embodiment, the user applications A (105) and B (108) through N (110) include web browser programs that display web pages from the server (112). In one embodiment, the user applications A (105) and B (108) through N (110) provide graphical user interfaces that display energy data analysis software and services hosted by the system (100).

As an example, the user application A (105) may be used by a user to select data with the data discovery component (118), select machine learning models using the model selection component (120), and publish machine learning models using the publication service (122). As another example, the user application B (107) may access a machine learning model using the model microservice (125) to analyze the energy data (170). As another example, the user application N (110) may display the dashboard (128).

The repository (160) is a computing system that may include multiple computing devices in accordance with the computing system (1400) and the nodes (1422) and (1424) described below in FIGS. 14.1 and 14.2. The repository (160) may be hosted by a cloud services provider that also hosts the server (112). The cloud services provider may provide hosting, virtualization, and data storage services as well as other cloud services and to operate and control the data, programs, and applications that store and retrieve data from the repository (160). The data in the repository (160) may be hosted by different databases and include the application data (162), the user data (165), the model data (168), and the energy data (170).

The application data (162) includes information hosted by the server (112) and presented to the user devices A (102) and B (107) through N (109). For example, the application data (162) may include HTML files that form the data discovery component (118), the model selection component (120), the publication service (122), etc.

The user data (165) includes information that describes the users of the system (100). The user data (165) may include user profile information, which may include values for the username of a user and settings for an application accessed by the user through the system (100). The user data (165) may be used to identify the data, applications, and services that a user is authorized to access.

The model data (168) includes data and information about the machine learning models for the data analysis projects generated by the users of the system (100). The model data (168) includes the artifacts of the models (parameters, weights, metadata, etc.) generated from training the machine learning models with the data selected by the users. The model data (168) may also include model analysis metrics that identify the accuracy of the models.

The energy data (170) is data that relates to energy. For example, the energy data may include data from one or more geographic locations corresponding to energy sources. In one embodiment, the energy data (170) includes exploration data, production data, subsurface data, etc. The energy data (170) may include data from wells, windfarms, mines, etc.

Although shown using distributed computing architectures and systems, other architectures and systems may be used. In one embodiment, the programs described above may be part of a monolithic application executing on the server (112), or the user devices A (102) and B (107) through N (109).

Figure 2:
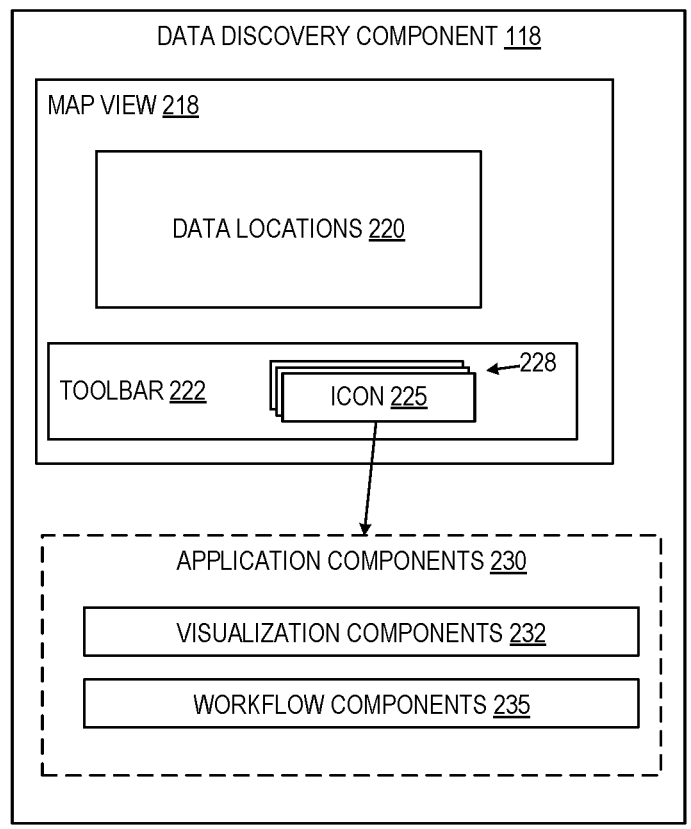

Turning to FIG. 2, the data discovery component (118) may be executed as part of the server application (115) (of FIG. 1) and is a collection of programs that may execute on multiple servers of a cloud environment, including the server (212). The data discovery component (118) presents the map view (218) with the toolbar (222) and the icons (228), which are context sensitive to the data locations (220) displayed with the map view (218). The map view (218) provides for execution of the application components (230) based on selection of one of the corresponding icons (228). In one embodiment, the data discovery component (118) may serve structured documents (hypertext markup language (HTML) pages, extensible markup language (XML) pages, JavaScript object notation (JSON) files and messages, etc.).

The map view (218) is a view of a map that may be presented to and displayed on the user devices A (102) through N (109) (of FIG. 1). In one embodiment, the map view (218) includes a geographic information system (GIS) map that shows geographical locations of sources of energy data. In one embodiment, users may zoom in and select subsets of the map view to identify the data locations (220) that correspond to the data the user is interested in analyzing.

The data locations (220) are locations on the map view (218) that identify the geographical locations of the sources of energy data on the map view. The energy data may include exploration data, production data, subsurface data, etc. For example, a data location may be shown on a GIS map in the map view (218) that corresponds to the geographic location of a wellsite. The data locations (220) may be shown with icons of different colors to indicate the types of energy data that correspond to the location.

The toolbar (222) is an overly of the map view (218). The toolbar (222) displays the icons (228). In one embodiment, the toolbar (222) may pop up onto the map view (218) after the user selects a subset of the map displayed in the map view (218).

The icons (228) (including the icon (225)) are displayed on the toolbar (222). The icons (228) correspond to the application components (230). The icons (228) are shown in a context sensitive manner. An icon (of the icons (228)) corresponding to a component application (of the application components (230)) is shown when the selected subset on the map view (218) includes a data location (of the data locations (220)) that includes data that can be processed or displayed by the component application.

The application components (230) are programs that may be executed based on the types of data in the data locations (220) on the map view (218). The application components (230) include the visualization components (232) and the workflow components (235).

The visualization components (232) are programs that visualize data identified by the data locations on the map view (218), by displaying the data. The visualization components (232) include two-dimensional viewers, three-dimensional viewers, log viewers, dashboards, etc. Two dimensional viewers display two-dimensional data and three-dimensional viewers display three-dimensional data. Log viewers display data from logs at the sites of the data locations (220). Dashboards may display analysis of the exploration and production data from the sites identified by the data locations (220). For example, a dashboard may be a business intelligence dashboard that identifies an amount of energy produced at a site.

The workflow components (235) are programs that initiate workflows for users. A workflow is a sequence of operations performed by a computer, which may be performed by a workflow component. For example, a workflow component may create a workspace for a programming project to build a machine learning model. In one embodiment, a workspace is a grouping of source code files that make up a larger unit (e.g., a web page, a website, a software program, etc.) and may include multiple files and directories. The workflow component may automatically import data identified by the data locations (220) selected with the map view (218).

Figure 3:
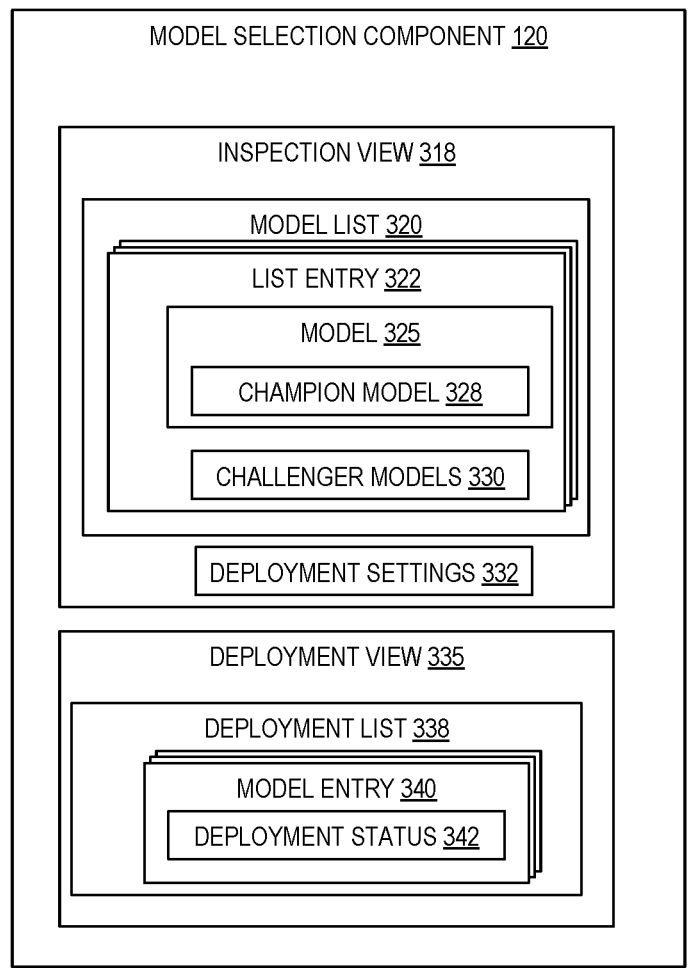

Turning to FIG. 3, the model selection component (120) may be executed as part of the server application (115) (of FIG. 1) and is a collection of programs that may execute on multiple servers of a cloud environment, including the server (112) (of FIG. 1). The model selection component (120) presents the inspection view (318) and the deployment view (335). The inspection view (318) displays models and deployment settings. The deployment view (335) displays the deployment status of models. In one embodiment, the model selection component (120) may serve structured documents (hypertext markup language (HTML) pages, extensible markup language (XML) pages, JavaScript object notation (JSON) files and messages, etc.).

The inspection view (318) is a view presented to a user of a user device (e.g., the user device A (102) of FIG. 1) in a user interface. The inspection view (318) includes the model list (320) and the deployment settings (332).

The model list (320) presents a list of entries (including the list entry (322)) of data analysis projects. A data analysis project is a project that analyzes data, which may include a workspace. In one embodiment, a workspace is a grouping of source code files that make up a larger unit (e.g., a web page, a website, a software program, etc.) may include multiple files and directories. One data analysis project may correspond to one list entry. In other words, a one-to-one mapping may exist between list entries and data analysis projects.

The list entry (322) is an entry for a data analysis project. The list entry (322) includes the model (325) and the challenger models (330). In one embodiment, the list entry (322) may include model accuracy metrics that identify the accuracy of the model (325). In one embodiment, the model accuracy metrics may include mean absolute value (MAV), mean absolute error (MAE), root mean squared error (RMS), Pearson correlation coefficient (PCC), etc.

The model (325) is a machine learning model that is selected for the data analysis project that corresponds to the list entry (322). The model (325) is identified as the champion model (328) from the challenger models (330).

The champion model (328) is selected from the challenger models (330). The champion model (328) is selected as the model to be deployed for the data analysis project represented by the list entry (322). The champion model (328) may be selected using model accuracy metrics describing the accuracy of the challenger models (330).

The challenger models (330) are a set of machine learning models from which the champion model (328) may be selected. The different challenger models (330) may use different machine learning model algorithms. The machine learning models may include regression models, random forest models, neural network models, etc. In one embodiment, the challenger models (330) are presented with model analysis metrics that may be used to identify the champion model (328) automatically by the system (100) (of FIG. 1).

The deployment settings (332) are settings for the deployment of the model (325). In one embodiment, the deployment settings (332) are presented to a user device and displayed in a user interface. In one embodiment, the deployment settings (332) identify central processing unit (CPU) and memory parameters (e.g., minimums and maximums) for deploying the model (325).

The deployment view (335) presents deployment information. The deployment view (335) may be presented to and displayed on a user device (e.g., the user device A (102)). The deployment view (335) includes the deployment list (338).

The deployment list (338) is a list of model entries including the model entry (340). In one embodiment, the deployment list (338) includes a model list for each machine learning model deployed with the system (100) (of FIG. 1).

The model entry (340) is an entry of the deployment list (338). The model entry (340) displays information about a model. In one embodiment, the model entry (340) corresponds to the model (325) and displays the deployment status (342) of the model (325).

The deployment status (342) is a set of information for the model entry (340). In one embodiment, the deployment status (342) may include an image, text, and a link. The image may represent the deployment status that is also identified with the text. The text of the deployment status may include strings stating "in progress", "fail", "pass", etc. The link may be provided after the model has been successfully deployed and include a uniform resource locator (URL).

Figure 4:
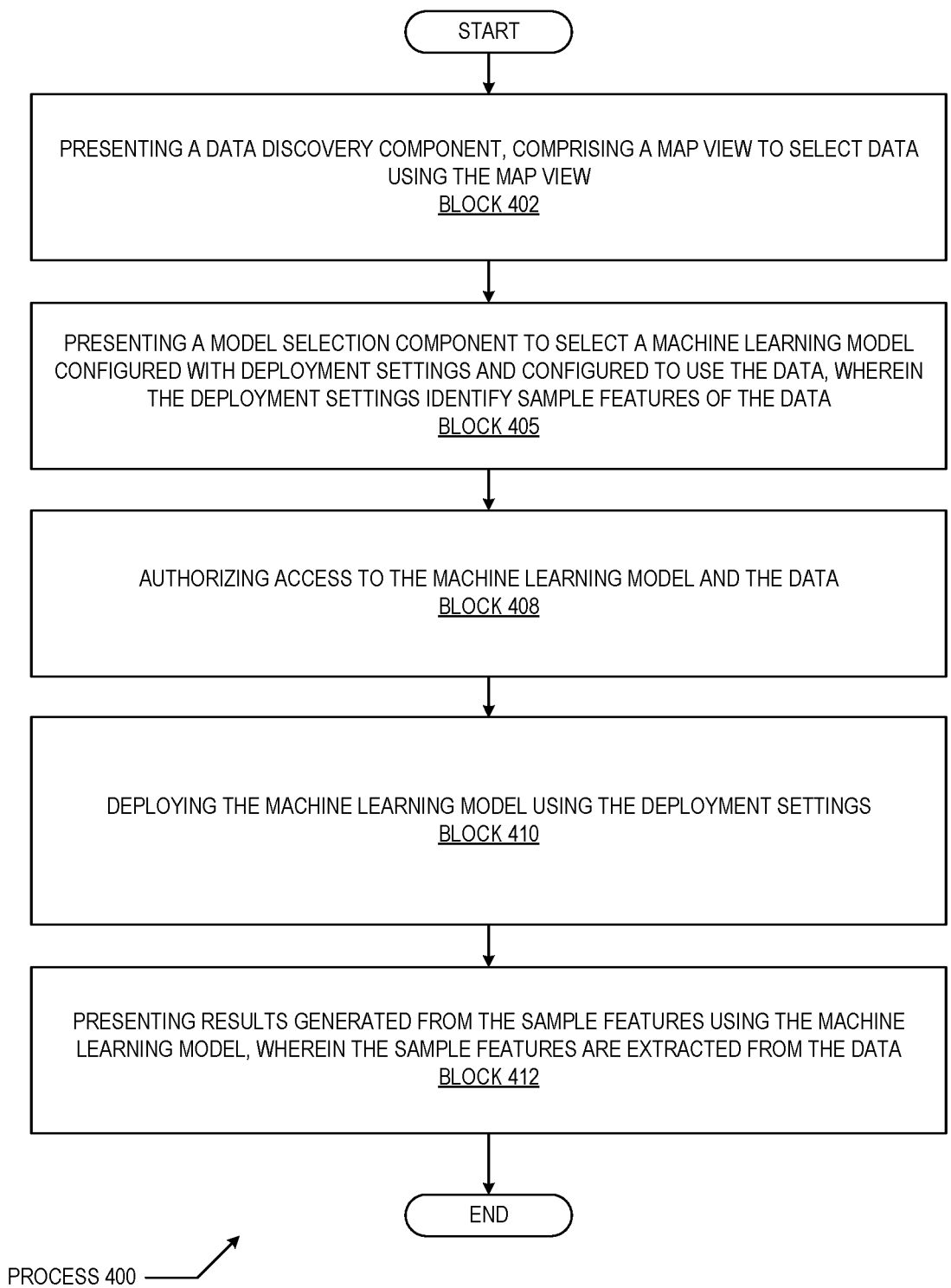
FIG. 4 shows a flowchart in accordance with disclosed embodiments.

Turning to FIG. 4, the process (400) implements an integrated energy data science platform. The process (400) may be performed by using one or multiple servers, client devices, server applications, client applications, etc.

At Block 402, a data discovery component is presented with a map view to select data using the map view. The data may be spatially aware data that identifies spatial coordinates. The map view displays the geographical location of energy data that may be used to develop a machine learning model and may be used by published machine learning models to generate results. In one embodiment, energy data may be selected by clicking a location on the map, which may trigger a development process to use the selected energy data within a data analysis project and train a machine learning model.

In one embodiment, the data discovery component is displayed on a user interface. The user interface may display the map view of the data discovery component and receive signals, from a human input device, to identify selections of data from the map view.

At Block 405, a model selection component is presented to select a machine learning model configured with deployment settings and configured to use the data selected with the data discovery component. The deployment settings identify sample features of the data. The sample features are specific types of data that may be extracted from data input to a model. Sample features may include specific types of energy data, including well site data (radiation, temperature, depth, porosity, etc.), production data (barrels produced, kilowatts per hour produced, etc.), etc.

The machine learning model may be registered with a publication service. The model may be registered by providing an identifier of the code (source code or executable code) of the machine learning model. The publication service may also receive comments and settings describing the inputs and outputs to the machine learning model that are presented with the model, which may be used as part of an application programming interface (API) to access the model.

In one embodiment, the model selection component is displayed on a user interface. The model selection component may be used to select a machine learning model. A data analysis project may identify multiple challenger models from which a champion model may be selected. The champion model of a data analysis project is the machine learning model that gets published for the data analysis project and used by external processes to process energy data and generate results. Maintenance of a data analysis project with the model selection component may include updating the training of the models of the data analysis project and selection of the champion model. Updating, training, and selection may be performed periodically and based on statistical metrics of model performance and accuracy.

At Block 408, access to the machine learning model and the data is authorized. Different processes and users of the system may have access to different machine learning models and different sources of data.

In one embodiment, a request to access to the machine learning model and the data is transmitted. The request may be transmitted from a client device to a server. The request may identify the user requesting access with the credentials of the user. The credentials may then be verified for permission to access a machine learning model and data.

At Block 410, the machine learning model is deployed using the deployment settings. In one embodiment, the deployment settings identify central processing unit (CPU) and memory parameters (e.g., minimums and maximums) for deploying the model. In one embodiment, deployment of a model includes identifying executable code of a trained version of the model, provisioning hardware (and software) resources (e.g., servers with processors, memories, application programming interfaces, etc.) in accordance with the deployment settings for the model, copying the executable code to the hardware resources, generating a link do identify the location of the model (and hardware resources), and transmitting messages notifying the system that the model has been deployed to the set of hardware resources.

In one embodiment, the machine learning model is periodically retrained. The retraining may be performed automatically based on a schedule. In one embodiment, the challenger models of a data analysis project are retrained and a new champion model is selected after retraining based on model accuracy metrics updated as part of the retraining. In one embodiment, the model accuracy metric used to identify a champion model is one of mean absolute value (MAV), mean absolute error (MAE), root mean squared error (RMS), Pearson correlation coefficient (PCC), etc.

In one embodiment, the machine learning model is published subsequent to presenting the model selection component. The model selection component may be used to receive the deployment selections for the machine learning model. After receiving the deployment selections, the machine learning model may be published.

In one embodiment, the machine learning model is deployed as a microservice. The microservice may be identified with a link, e.g., a uniform resource locator (URL). When the link is accessed, the microservice executes the code of the machine learning model to process the input data and generate results that are returned in response accessing the link.

At Block 412, results are generated from sample features using the machine learning model are presented. The sample features are extracted from the data (i.e., energy data). In one embodiment, the code of the machine learning model is executed by a server to generate the results from the data.

In one embodiment, the results are presented with a dashboard. The dashboard may be presented using a browser that displays the results.

In one embodiment, the results are transmitted to a domain application. A domain application may be a third party application that consumes results from a machine learning model. Consumption of the results may include displaying the data to user devices.

In one embodiment, results generated from the data using the machine learning model are displayed, on a user interface. Display of the results may be through a dashboard or a domain application.

In one embodiment, a model lineage is presented. The model lineage may be updated when a model is deployed. The model lineage may be stored in a repository as a structured text file, a database record, etc. The model lineage identifies training steps and training data used to generate the machine learning model.

In one embodiment, a data lineage is presented. The data lineage may be stored in a repository as a structured text file, a database record, etc. The data lineage identifies data sources and machine learning models used to generate the results, i.e., a set of data output by a machine learning model.

Figure 5:
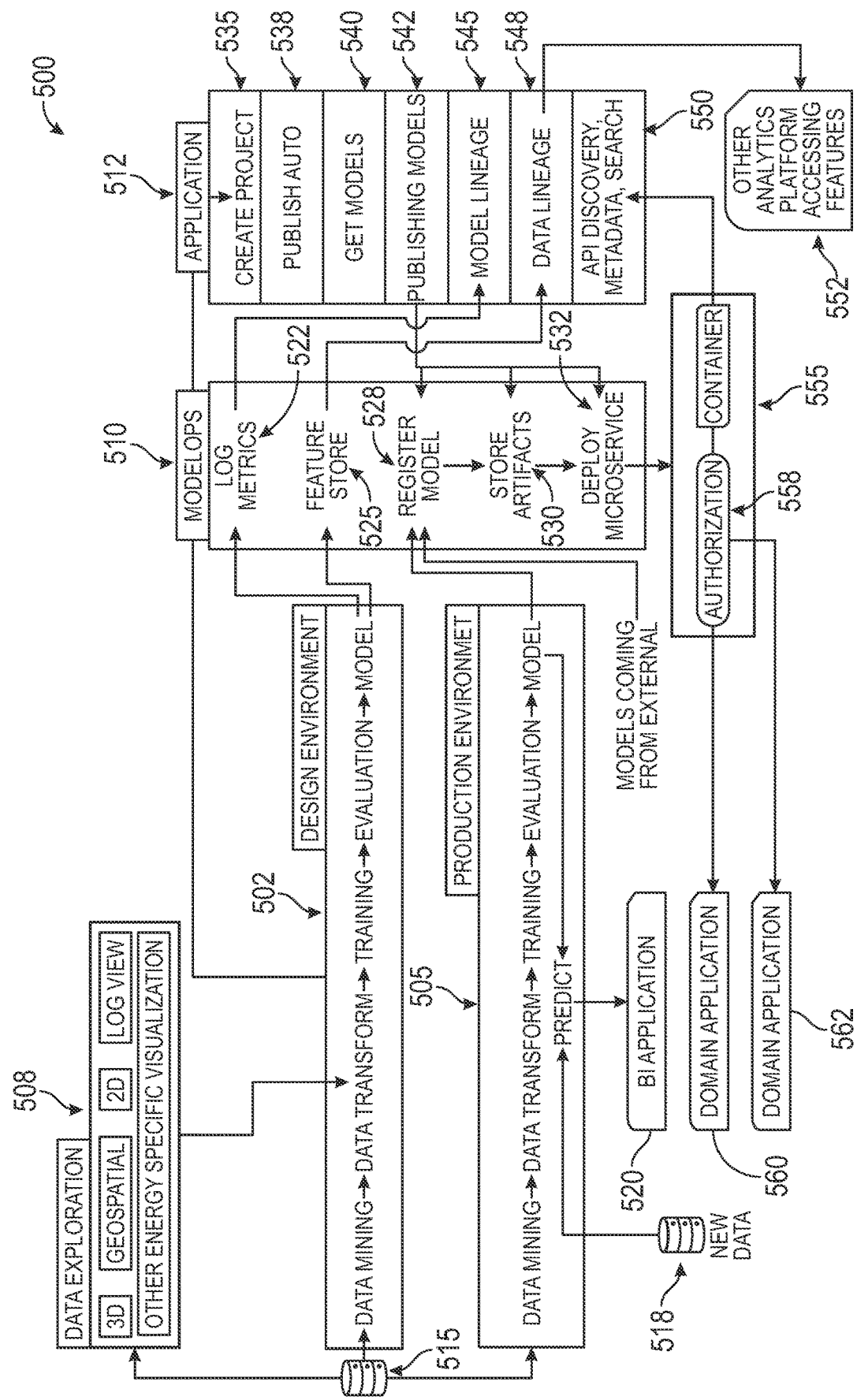

Turning to FIG. 5, the system (500) includes multiple software and hardware components to implement an integrated energy data science platform. The system (500) includes the design environment (502) and the production environment (505) that utilize the data exploration component (508), the model operations component (510) and the application component (512).

The design environment (502) includes software and hardware components to execute processes that handle workflows during design of a machine learning model. The design environment (502) includes programs that operate to perform the workflows of data mining, data transformation, training, evaluation, and model selection. The data mining workflow identifies specific data from larger sources of data for use in a machine learning model. The data transformation workflow processes the data identified with data mining to be suitable for input to a machine learning model. The training workflow processes in machine learning model with data to improve the accuracy of the machine learning model. The evaluation workflow processes the trained models to identify the accuracy of a machine or model. The model selection selects a model based on the evaluation. The design environment (502) utilizes the repository (515), which may use the data exploration component (508) and the model operations component (510) to perform the workflows of the design environment (502).

The production environment (505) includes software and hardware components to execute processes that handle workflows during use of machine learning models after being published. The production environment (505) includes programs that operate to perform the workflows of data mining, data transformation, training, evaluation, model selection, and prediction. In one embodiment, the design workflows of the design environment prepare data and programs for use by external entities in the production workflows of the production environment. The prediction workflow processes the new data (518) using a production model to generate prediction. The predictions may be transmitted to the business intelligence application (520).

The data exploration component (508) may be an implementation of the data discovery component (118) of FIG. 1. The data exploration component (508) includes viewers for different types of data, including 3D viewers, geospatial viewers, 2D viewers, log viewers, etc. 3D viewers display three-dimensional data. Geospatial viewers display geospatial data. 2D viewers display two-dimensional data. Log viewers display log data. The data may be from the repository (515) and include energy data.

The model operations component (510) may be an implementation of the model selection component (120) of FIG. 1. The model operations component (510) includes programs and processes utilized by the system (500). The log metrics process (522) logs the metrics of the machine learning models developed using the design environment (502). The feature store process (525) identifies features used by and identified by the machine learning models developed with the design environment (502). The features may be identified from the deployment settings during deployment of a model. The register model process (528)

registers models, developed with the design environment (502), with the production environment (505). The store artifacts process (530) stores the artifacts of the machine learning models used by the system (500). The artifacts include the weights, parameters, meta parameters, metadata, etc., used by the machine learning models of the system (500). The deploy microservice process (532) deploys microservices that encapsulate the models developed and used by the system (500).

The application component (512) includes programs and processes utilized by the system (500) in conjunction with the model operations component (510). The create project process creates a new data analysis project that may import data discovered with the data exploration component (508). The publish auto process (538) may automatically publish models that have been developed through the design environment (502) with the model operations component (510). The get models process (540) retrieves models that may be used by the system (500), including models that may not have been developed by the system (500). The publishing models process publishes models using data generated by the register model process (528), the store artifacts process (530), and deploy microservice process (532) of the model operations component (510). The model lineage process (545) stores the model lineages of the machine learning models used by the system (500). The data lineage process (548) stores the data lineages of the data used by the system (500). The API discovery, metadata, search process (550) presents interfaces for the usage and discovery of the machine learning models used and published by the system (500).

The repository (515) stores data used by the system (100). The data includes energy data that may be mined, transformed, and input to machine learning models.

The business intelligence application (520) is a program that consumes results generated by machine learning models. In one embodiment, the business intelligence application (520) may display the results to a user device through a browser application.

The other analytics process (552) exposes the data lineage. The other analytics process (552) provides interfaces for external processes to view the process the data lineages of the data used by the system (500).

The container (555) contains a machine learning model that may be used by the domain applications (560) and (562) based on authorization with the authorization process (558). The authorization process (558) authorizes use of the data and machine learning models provided by the system (500) to the domain applications (560) and (562). The domain applications (560) and (562) may be external applications that utilize results generated from the data and machine learning models provided by the system (500).

The platform architecture of the system (500) includes several components. The components of the system (500) integrate as a system to address the machine learning problems in the energy industry.

A data consumption framework, (also referred to as a consumption zone and shown as the business intelligence application (520) and the domain applications (560) and (562)), is a performant consumption layer for the energy data sources, including but not limited to the OSDU data platform of the Open Group Limited Company United Kingdom Apex Tower, Forbury Road Reading Berkshire Great Britain RG11AZ. Multiple micro-services led ingestion and synchronization of the data is performed from single or a plurality of data sources containing energy specific or other data sources. The consumption zone protects the integrity of the original data by maintaining the legal tag and audit command language (ACL) of the source data. The consumption zone provides read/write performance for the business intelligence (BI) and artificial intelligence (AI) workflows.

The data exploration component (508), relying on the data consumption layer or an integration within the data sources, provides multiple levels of visualization into the energy data sources to facilitate data exploration. Geographic information system (GIS) maps provide holistic view of the datasets, enabling filtering and selection on the data. 2D and/or 3D canvases are used to perform quality control (QC) of various kinds, such as seismic data, well logs and well tops. Intelligent algorithm is used to recommend the best fit components and workflows for the selected data. The data discovery compliments the machine learning pipeline and helps increase efficiency by reducing the time spent on finding right data for the data modeling.

The platform architecture of the system (500) isolates the design environment (502) and the production environment (505) to provide stability and high availability for production while isolating the system from general data science users.

The design environment (502) of the system (500) is suitable for both low code and high code usage, which may include integration of third party data science platforms adopted to enable both citizen data scientists and advanced machine learning (ML) practitioners to perform feature engineering, data wrangling, model architecting, modeling training and testing. The design environment (502) also enables orchestration of traditional mathematical or physical simulations built independently or in combination with an AI pipeline or a data management pipeline. The results from simulations or models introduced as inputs or outputs to ML modeling to achieve better reservoir understanding workflows, which are not possible with traditional data science platforms. The orchestration and coupling of physical simulation models and ML models are used to solve complex problems.

The production environment (505) is another component of the platform architecture of the system (500), wherein a combination of third party and inhouse technology may be used and combined to enable deployment and execution of the models. The ML production environment supports both batch processing and real-time scoring. The ML production environment provides compute elasticity through cloud auto-scaling and provides support for both regular ML model pipelines as well as the orchestration/coupling of physical simulations/models with ML pipelines.

An integration framework for business intelligence (BI) tools into data science platforms is another component of the platform architecture. For the integration framework, BI tools are used to discover data as inputs to the ML workflows, and the outputs from the ML models can be streamed into the consumption layer and visualized through BI dashboards (including the business intelligence application (520)).

The model operations component (510) is another component of the platform architecture of the system (500), which includes a set of tools to enable deployment, integration and monitoring of the ML models. The model operations component (510) is a platform that automates the registry, storage, deployment, logging and monitoring of the ML models. It also provides high performance computing (HPC) clusters for model execution, with intuitive interface to test and validate the deployed services and application programming interface (API), to help integration of ML predictions with other applications.

A ML project governance application is another component of the platform architecture. The ML project governance application allows users to create and manage the ML projects, publish, import and query ML models. The ML project governance application is the entry point for data scientists to start productive creation.

The seamless integration with the energy data platforms, unique data discovery and visualization, intuitive low-code ML environment combined with the power the model operations component (510) and project integration and management capability make the platform architecture of the system (500) a powerful machine learning platform for energy data. Disclosed embodiments provide a low entry point for data scientists and enhances efficiency by maximizing the benefit of automation and minimizing the friction throughout the entire machine learning pipeline.

Embodiments of the disclosure provide an E&P/energy specific end-to-end data science platform architecture.

Embodiments of the disclosure provide an end-to-end data science platform for energy requests that is fit for purpose for energy specific applications.

Embodiments of the disclosure may be applied internet of things (IOT) applications and used in other products for data discovery.

Embodiments of the disclosure may be applied to low code composable app frameworks.

Embodiments of the disclosure may replace existing silos of data mining and with visualization-based data mining using geospatial tools, 3D data, 2D data, well correlations, etc. Embodiments of the disclosure integrate business intelligence for data mining as well as prediction results visualization.

Embodiments of the disclosure automates model operations to democratize data science and reduce the time to market for machine learning.

Embodiments of the disclosure provides low code composability to democratize usage beyond developer/data scientist to those who are familiar with the domain expertise.

Embodiments of the disclosure orchestrate physical simulation and ML to better integrate capabilities on a single platform to simplify workflow/model management.

Embodiments of the disclosure provide integrated connections to E&P specific data sources and provide automation of the model operations component (510) to democratize the data science and reduce the time to market for machine learning.

Embodiments of the disclosure provide an intelligent way of doing data mining and an end-to-end integrated machine learning design and deployment in a single platform through a unique integration of AI and BI tools.

Embodiments of the disclosure provide an end-to-end platform supporting native integration to E&P specific data sources and visualizations.

Figure 6:
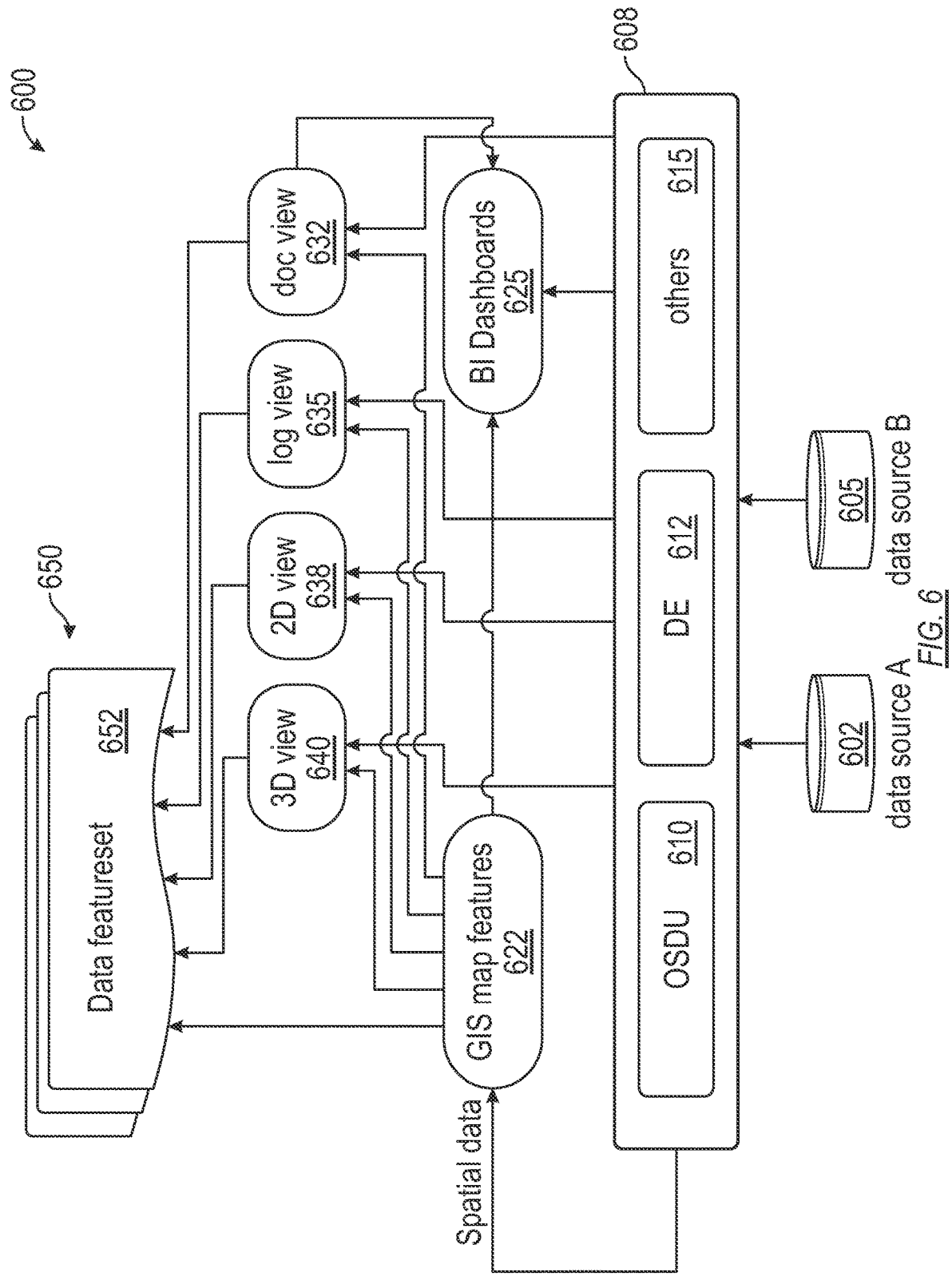

Turning to FIG. 6, the system (600) implements advanced data discovery and visualization for energy data sources. Data from the data sources A (602) and B (605) is viewed and located using the system (600). FIG. 6 shows diagram of an energy data system incorporated into the data discovery flow. The technique in FIG. 6 has been deployed on top of the standard industry data platforms such as the open subsurface data universe (OSDU) but not limited to it. It can also be used to operate on other energy data sources.

The data sources A (602) and B (605) are sources of energy data. For example, data source A (602) may provide energy data generated by well sites and the data source B (605) may provide energy data provided by renewable energy sources. Data from the data sources A (602) and B (605) are exposed by the platforms (608).

The platforms (608) provide access to data from the data sources A (602) and B (605). The platforms (608) include the OSDU platform (610), the data ecosystem (DE) platform (612), and other platforms (615). Different platforms may provide a different APIs application programming interfaces (APIs) for accessing the data sources A (602) and B (605). The platforms (608) provide data to the GIS (geographic information system) map features (622), the BI (business intelligence) dashboards (625), the 3D view (640), the 2D view (638), the log view (635), and the doc view (632).

The GIS map features (622) are the location features for the data from the data sources A (602) and B (605). The location features are the surface locations that identify the geographical location (e.g., longitude and latitude coordinates) of the data from the data sources A (602) and B (605). In one embodiment, system (600) retrieves spatial data using the platforms (608) to generate the GIS map features (622). The system (600) provides the GIS map features (622) to the data feature sets (650), the 3D view (640), the 2D view (638), the log view (635), the doc view (632), and the BI dashboards (625).

The BI dashboards (625) consume and display the data processed by the system. Data displayed by the BI dashboards (625) includes data from the platforms (608), the GIS map features (622), and the doc view (632).

The doc view (632) provides a document view of data from the system (600). For example, the doc view (632) display data from the data sources A (602) and B (605), accessed through the platforms (608), with data from the GIS map features (622) in a document. Documents may include spreadsheets, log files, word processor files, etc.

The log view (635) provides views of logs. The views of the logs show data from the data sources A (602) and B (605) accessed through the platforms (608).

The 2D view (638) provides two-dimensional views. The two-dimensional views show data from the data sources A (602) and B (605) accessed through the platforms (608). The two-dimensional views may show surface data, subsurface data, combinations thereof, etc.

The 3D view (640) provides three-dimensional views. The three-dimensional views show data from the data sources A (602) and B (605) accessed through the platforms (608). The three-dimensional views may show surface data, subsurface data, combinations thereof, etc.

The data featuresets (650) (including the data feature set (652)) are sets of features extracted from the data sources A (602) and B (605). Different data featuresets (650) may be used in different project workspaces.

Figure 7:
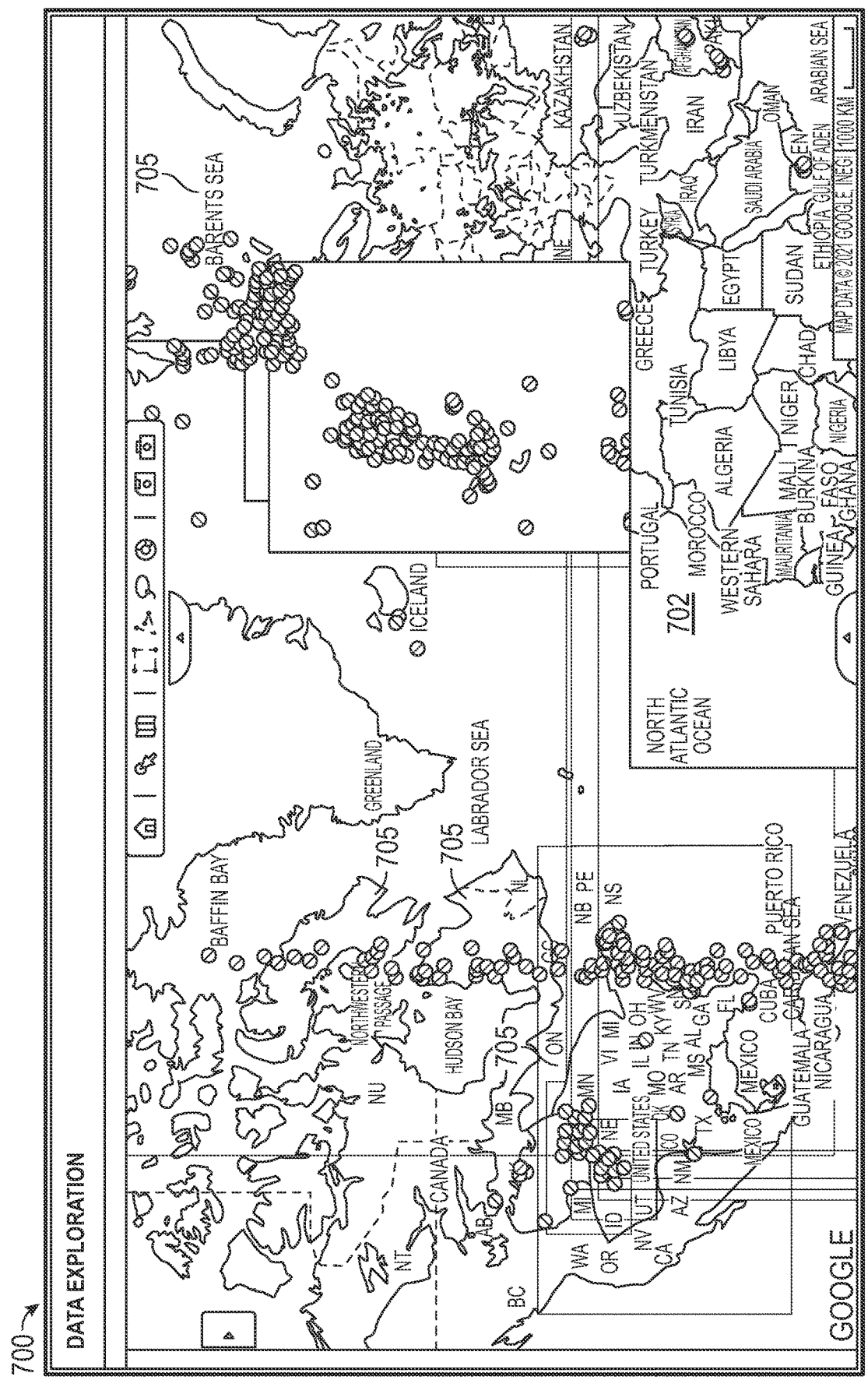

Turning to FIG. 7, the GIS map (702) is used for machine learning data discovery. The GIS map (702) is displayed in the user interface (700) with the data locations (705). Upon connecting to the data platform, a geographic information system (the GIS map (702)) is presented with a default set of layers with various kinds of geospatial data from the underlying data layer. Energy domain data such as wells, pipelines, trajectories and culture data, are represented on the map as points, lines and polygons (referred to as the data locations (705)).

Layer and shape manipulation tools are available as part of the GIS map view to further filter the data or configure additional layers on the GIS canvas. Users can use different selection tools (lasso, rectangular etc.) to zoom into the subsets of data for data modeling.

Figure 8:
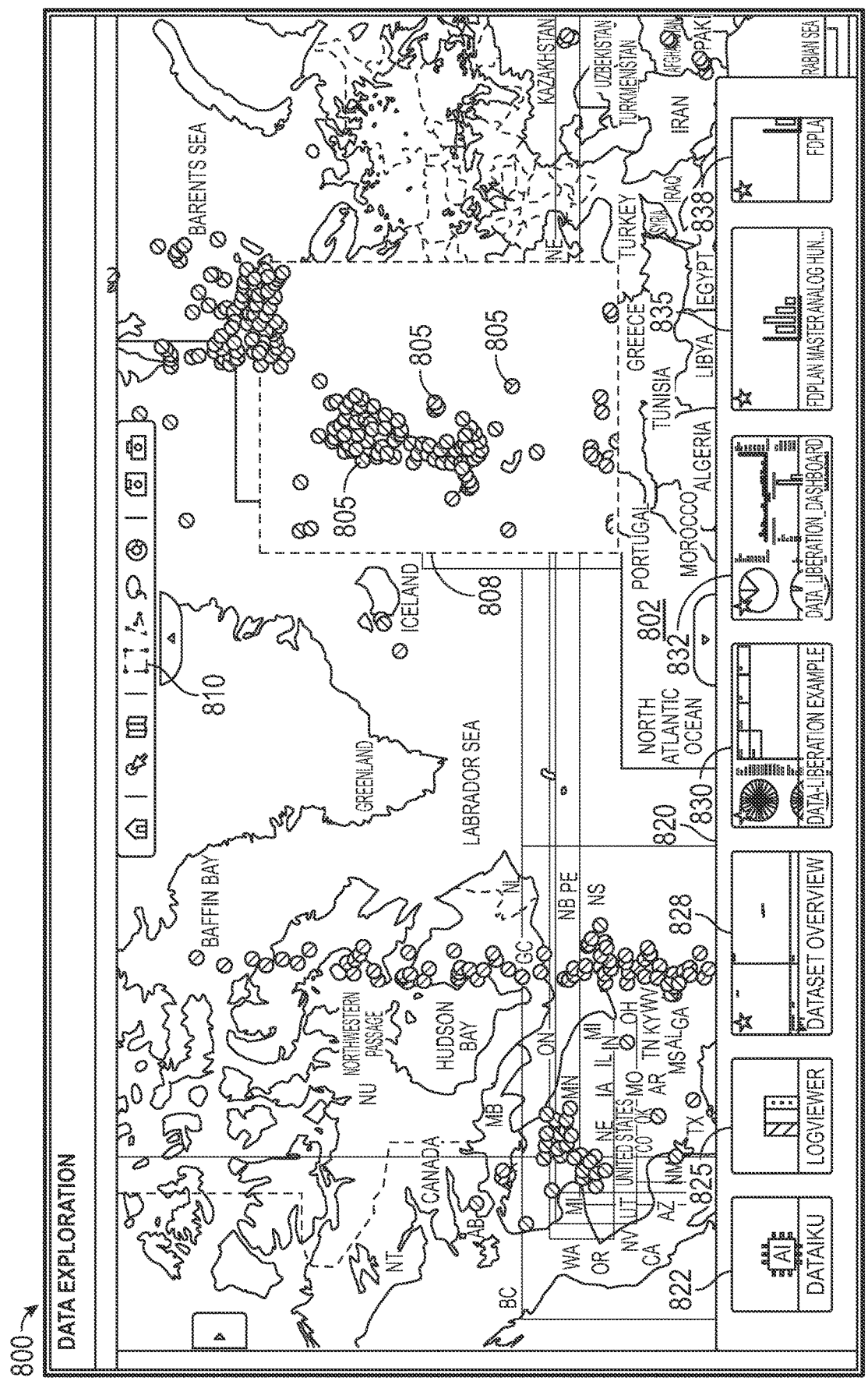

Turning to FIG. 8, the GIS map (802) is displayed in the user interface (800) with the data locations (805). The subset (808) of the GIS map (802) is selected with a rectangular select tool (activated by selecting the icon (810). The subset (808) includes a selected subset of the data locations (805) that are within the rectangle defined by the subset (808). The toolbar (820) displays the icons (822) through (838) for workflow components and visualization components.

The icons (828), (830), (832), (835), and (838) correspond to additional visualization components. The visualization components corresponding to the icons (828), (830), (832), (835), and (838) may be displayed as part of a dashboard. The dashboard may display various graphs with results calculated from data corresponding to at least one of the data locations (805) from the subsets (808).

The icon (825) corresponds to a visualization component, which is a log viewer. Selecting (i.e., clicking on) the icon (825) loads a log viewer that displays data corresponding to at least one of the data locations (805) from the subset (808). The log viewer is further described at FIG. 9.

The icon (822) corresponds to a workflow component used to create machine learning models. Selecting the icon (822) initiates a program that creates a project workspace that automatically imports data corresponding to at least one of the data locations (805) from the subset (808). The workflow component is further described at FIG. 10.

FIG. 8 shows a diagram of visualization components. When a data selection is performed, the selection triggers an innovative recommendation algorithm, where the selected entity types are passed in as the context. The algorithm calculates the affinities of the entity types and the available UI components related to the data selected, based on the tags attached to the UI components. As the result of the calculation, a set of recommended visualization (Log viewer, 3D/2D canvas, BI dashboards etc.) and workflow (Machine learning, data QC etc.) components is presented to the users. Users can choose to open a visualization component that is best suited for the data.

Figure 9:
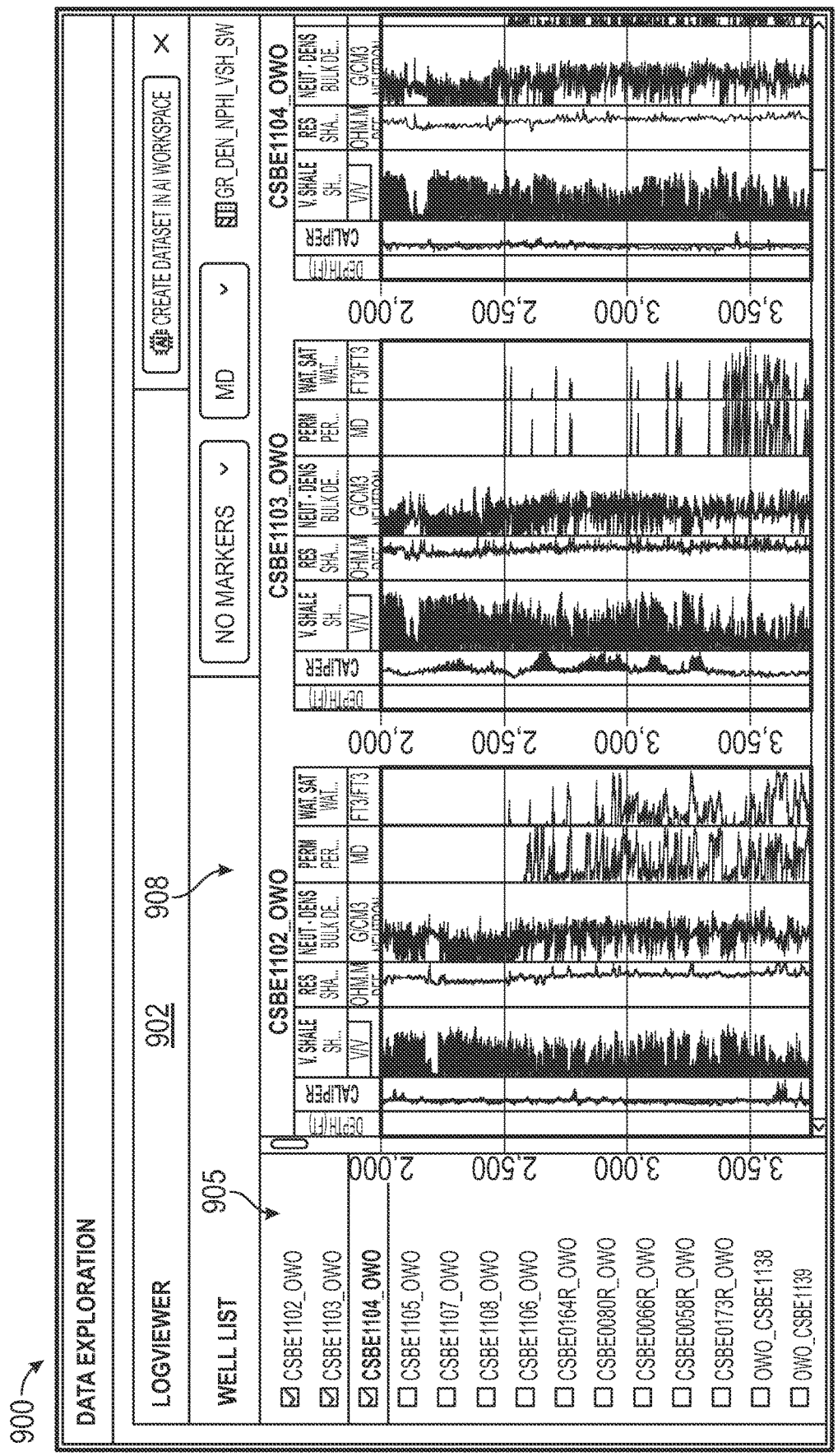

Turning to FIG. 9, the user interface (900) may be displayed to a user. FIG. 9 shows a diagram of a user interface for data quality control (QC) using a visualization component for a specific data type. Further quality control or analysis can be performed on the data before the data is used in the machine learning process (such as shown in FIG. 10).

For example, the user interface (900) includes the log viewer (902). The log viewer (902) displays the list (905) of wells that correspond to a location identified from a map view (see FIG. 8). Check boxes allow for the selection of data from one or more wells. Three wells are selected and the data for the three wells is shown in the window (908).

The window (908) displays data selected from the list (905) that corresponds to data from a data location selected from a map view (see FIG. 8). The window (908) presents the data in a manner that the user may scroll through and view the data.

Figure 10:
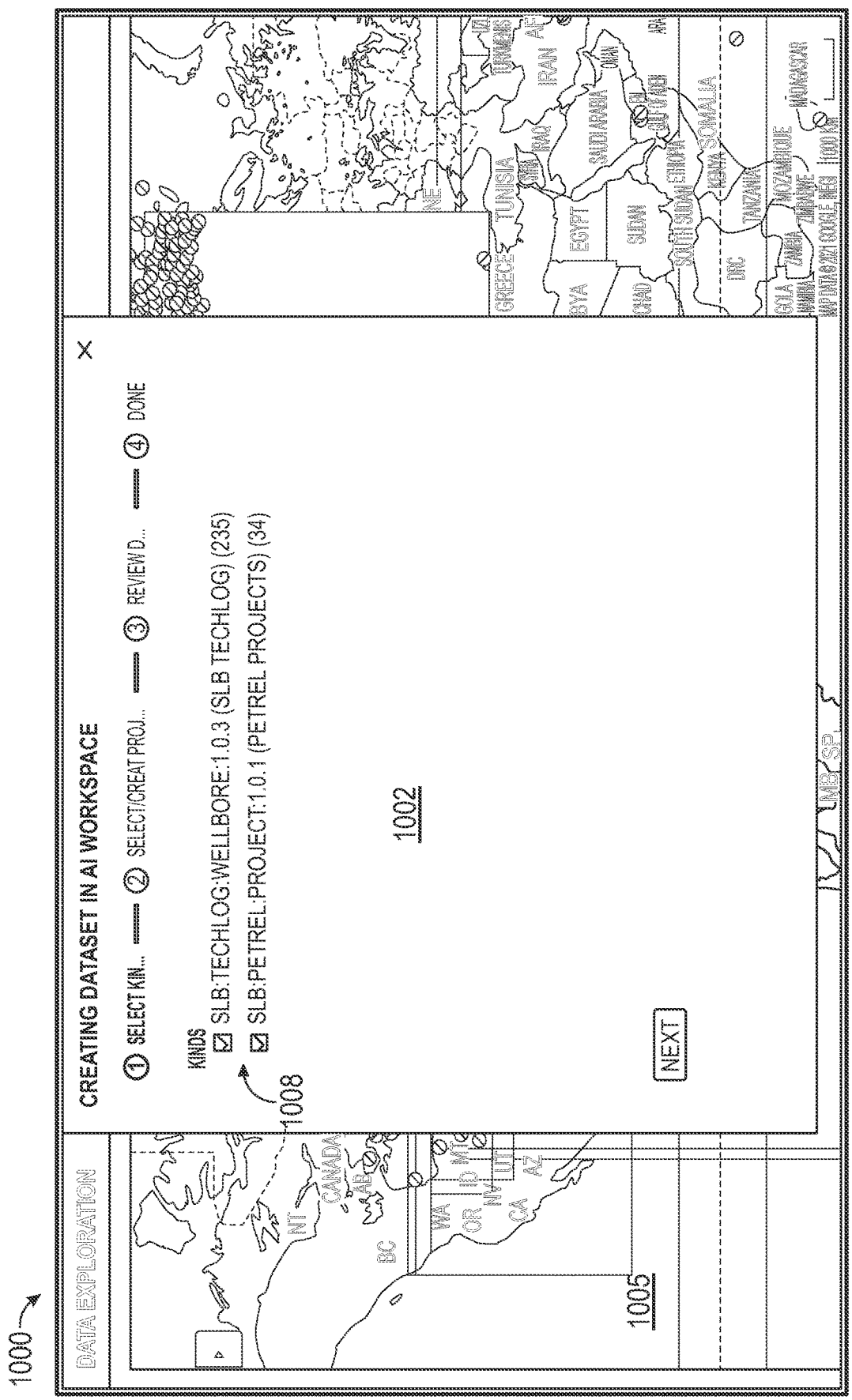

Turning to FIG. 10, the user interface (1000) is updated to display the window (1002) of a workflow component on top of the map view (1005). FIG. 10 shows a diagram for the workflow component triggered from data discovery workflow (i.e., from the map view (1005)). Users can select one of the workflow components, such as machine learning, which triggers the workflow of creating a machine learning process, with the selected datasets being included in the project (e.g., as shown in FIG. 10). The workflow of the window (1002) provides for the selection of a type of project (e.g., using the check boxes (1008)). Once the project is created, the project will have the data (e.g., the well sites selected from FIG. 9) automatically imported into the project. Relevant workflow components are connected through a common data platform (e.g., one of the platforms (608) of FIG. 6). This enables the data discovery to be able to notify the requirements of data to the machine learning component, which further executes the data import and load. In one embodiment, The data is imported into the project by constructing a suitable dataset and calling an internal application programming interface (API).

FIGS. 11.1, 11.2, and 11.3 show examples of a user interfaces with inspection views. Embodiments of the disclosure provide scalable, collaborative and production ready platform with the rich set of tools and an intuitive UI (user interface) to make the machine learning operations seamless and efficient for an enterprise. Data scientist users may train, test, and track multiple machine learning models and may create custom models through an embedded notebook interface (e.g., python notebooks). Models are versioned with lineage and a history of the model is kept that includes: the time the model was trained, the data the model was trained with, metadata, algorithms, parameters, validation accuracy, etc., which are stored in a repository. The above information may be visible to users through an intuitive user interface. FIG. 11.1, shows an example user interface that displays multiple models and versions inside of a collaborative project.

The trained models can then be deployed as representational state transfer (REST) or "gRPC remote procedure calls" (gRPC) based services. The deployed model may be integrated with role-based access controls and legal governance. The steps of packaging, scaling and deploying the model on elastics compute is fully automated. Furthermore, the runtime clusters may be customized for different computation requests with the options of graphics processing unit (GPU), tensor processing unit (TPU), serverless, and accelerated parallel computation (CUDA). Data scientist users may test the API (application programming interface) of a deployed model with the user interface (UI). An example of simple model deployment through a UI is shown in FIGS. 11.2 and 11.3, in which use of the UI reduces the time to market for AI (artificial intelligence) projects.

Figure 12:
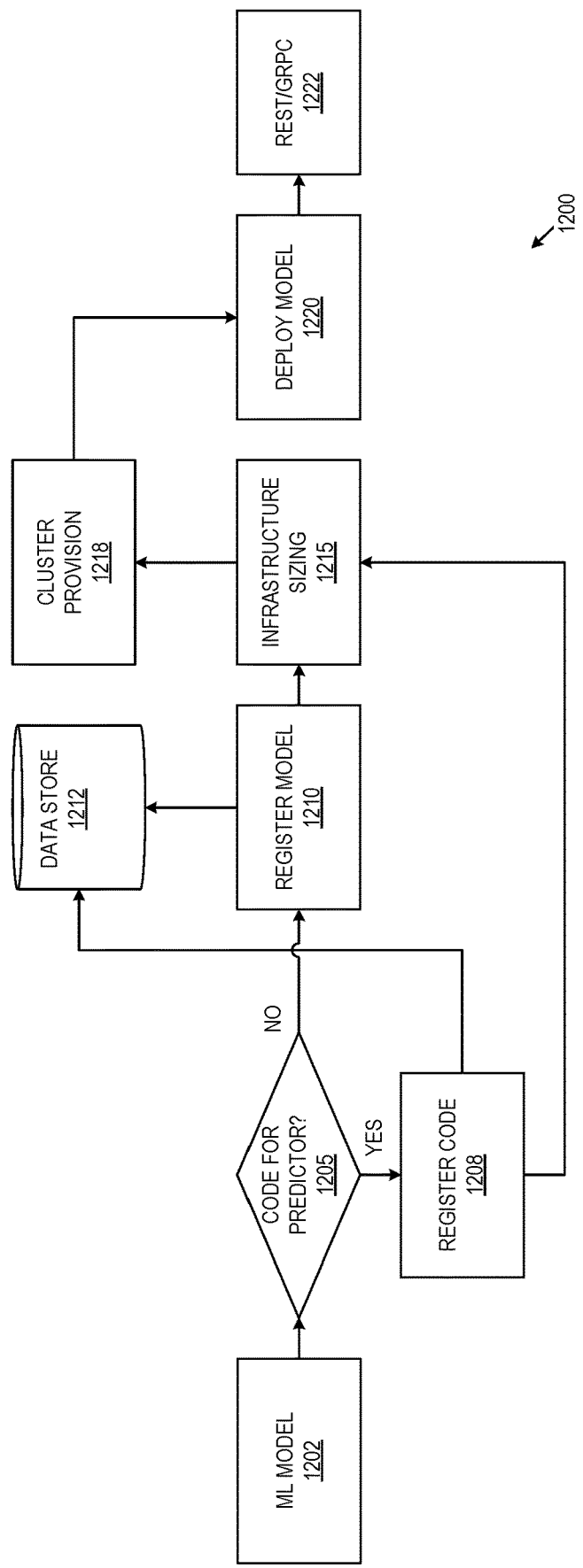
FIG. 12, and FIG. 13 show examples in accordance with disclosed embodiments.

FIG. 12 shows the model deployment flow that works underneath the UI. While data scientist users deploy the models, the related metadata and model files may be stored in various elastic storages. Models may be deployed in either a cloud based or on an on-premises cluster.

In one embodiment, the deployment process embraces continuous integration and continuous delivery (CI/CD) (e.g., evergreen models) by setting up automated pipelines to train, test, and deploy models in production. Continuous integration and continuous delivery continuously improves the models with the latest energy data. Data scientist users may also compare the accuracy of various models by replaying the predictions of a model on historical production data.

Figure 13:
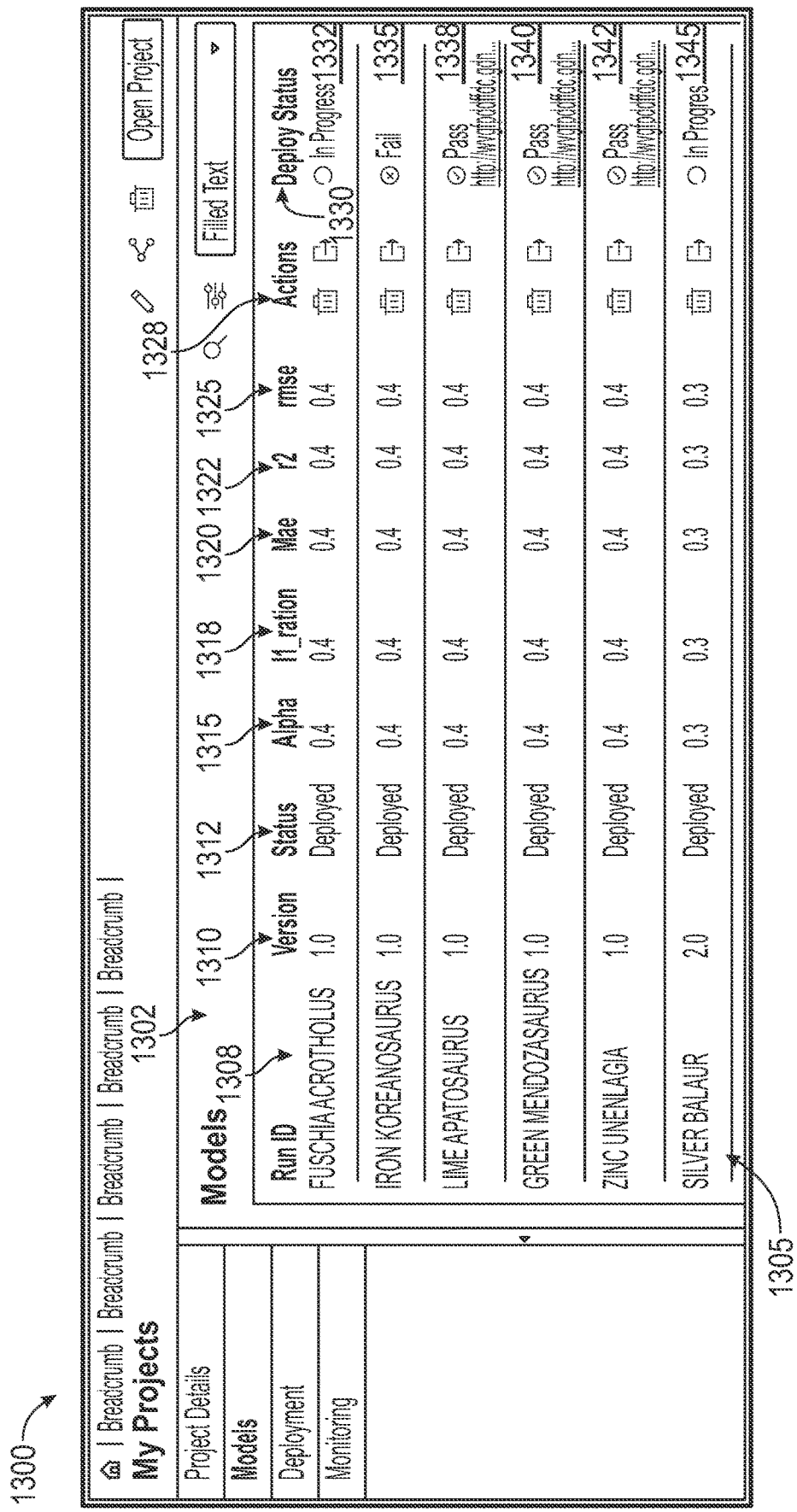

In one embodiment, the system provides enterprise level performance monitoring of deployed models, an example of which is shown in FIG. 13. The performance metrics that are tracked include audit logs and relevant performance indicators. Model drift alerts may be set up to capture the model degradation over time. In addition to capturing performance metrics, the performance monitoring is further instrumented to enable auto-scaling of the compute resource for visibility and cost management.

Turning to FIG. 11.1, the user interface (1100) display the inspection view (1102). The inspection view (1102) includes the project window (1105) and the model window (1108).

The project window (1105) includes the model list (1110) displayed in a table. The table includes the rows (1112) and (1115) and includes the columns (1118), (1120), (1122), (1125), (1128), (1130), (1132), and (1135).

The columns (1118), (1120), (1122), (1125), (1128), (1130), (1132), and (1135) identify information for the data analysis projects displayed in the model list (1110).

The column (1118) displays model identifiers of the models of the data analysis projects displayed in the model list (1110). The model identifiers disambiguate between different data analysis projects. In one embodiment, the model identifiers of the models may be strings with alphanumeric characters.

The column (1120) displays names of the models. The names of the projects may be selected by the user and include a name for the workspace of the projects.

The column (1122) displays version identifiers of the models of the projects displayed in the model list (1110). The version identifiers disambiguate between different versions of a model corresponding to a row of the model list (1110).

The column (1125) displays deployment statuses of the models. The deployment status of a model may be displayed with a text string, e.g., "Deployed", "Not Deployed", etc.

The columns (1128), (1130), and (1132) display model accuracy metrics. The model accuracy metrics include Pearson coefficients in the column (1128), mean absolute error (MAE) in the column (1130), and r squared root mean squared error (R2RMSE) in the column (1132).

The column (1135) displays actions that may be taken for the models. Each action may be displayed with an icon that, when selected, performs the action. Actions that may be performed include deploying a model and entering deployment settings for a model.

The rows (1112) and (1115) correspond to different data analysis projects. One row of the model list may correspond to a model, a data analysis project, and a workspace. Selection of the row (1112) triggers an update to the model window (1108) to display the champion and challenger models associated with the row (1112).

The model window (1108) displays the cards (1138), (1140), and (1142) for the champion and challenger models for the row (1112). Each of the cards (1138), (1140), and (1142) display model accuracy, a text description of the algorithm of the model, and a date identifying when the corresponding model was most recently updated.

The card (1138) indicates that the model corresponding to the card (1130) is the active model. The active model is the model that will be used by the external developers as opposed to the model represented by the cards (1140) and (1142).

The card (1142) indicates that the model corresponding to the card (1142) is the latest model. The latest model is the model that has been most recently updated. The latest model may not be the active model, for example, when the performance of the latest model is not as high as the other models.

Turning to FIG. 11.2, the deployment settings window (1150) is displayed. The deployment settings window (1150) is displayed in response to selection of an action from the column (1135) of the row (1112) (of FIG. 11.1). The deployment settings window (1150) is displayed on top of the inspection view (1102).

Turning to FIG. 11.3, the deployment settings window (1150) displays the user interface elements (1152) through (1170). The user interface elements (1152) through (1170) are used to collect deployment settings.

The user interface elements (1152) collects a deployment name. The deployment name is a text string input by the user to the user interface elements (1152).

The user interface element (1155) collects a short description for a deployment. The short description is a textual description for the deployment that is stored as a text string with the deployment settings.

The user interface element (1158) collects the number of replicas to be used for deployment. The number of replicas identifies the number of times a process of a model may be replicated on a virtual machine.

The user interface element (1160) collects the CPU request amount and the user interface element (1162) collects the limit to the CPU request. The limit identifies the upper bound for the number of CPUs for deploying a machine learning model. In one embodiment, the units of the request are in thousandths of a core (e.g., a request of "500" is for 0.5 cores).

The user interface element (1165) collects the memory request amount and the user interface element (1168) collects the limit to the memory request. The limit identifies an upper bound for the amount of memory for deploying a machine learning model. In one embodiment, the units of the request are in megabytes (e.g., a request of "64" is for 64 megabytes).

The user interface element (1170) collects structured text that identifies the sample features used by the machine learning model. These sample features are the features that are input to the machine learning model. The sample features for the machine learning model corresponding to the deployment settings window (1150) includes the "height" and the "area". Different models may use different sample features.

Turning to FIG. 12, the flow (1200) includes several blocks that may be performed by systems implementing the disclosure. The flow (1200) may be implemented with a server computer.

At Block 1202, a machine learning model is selected. The machine learning model is part of a data analysis project with a workspace. The workspace includes data identified by the user. The data may be energy data that is analyzed using the machine learning model. The machine learning model may provide predictions based on the input energy data and be referred to as a predictor.

At Block 1205, a determination is made as to whether the machine learning model includes code. The machine learning model may be implemented using source code files. Previously developed machine learning models may be implemented with executable files that may not include the original source code for the model.

At Block 1208, if the machine learning model includes code, then the code is registered to the data store (1212). The code registered to the data store may be updated periodically or on demand when changes are made to the code. The code may be written in a programming language, including Python, C, C++, Java, etc.

At Block 1210, when the machine learning model does not include code, then the model made be registered to the data store (1212) by identifying a version of the model. The version of the model may be updated periodically or on demand when changes are made to the model.

The data store (1212) is a repository of information. The data store (1212) may be implemented as a computing system that may include multiple computing devices in accordance with the computing system (1400) and the nodes (1422) and (1424) described below in FIGS. 14.1 and 14.2.

At Block 1215, after the machine learning model (and corresponding code) is registered, infrastructure sized to deploy the machine learning model. Sizing the infrastructure includes selecting the amount of processing power and memory to devote to a process that implements the machine learning model. Sizing the infrastructure may also include identifying the number of virtual machines to execute the processes that implement the machine learning model.

At Block 1218, clusters are provisioned. A cluster is a collection of virtual machines that execute the process is implementing the machine learning models. The clusters are provisioned by logging into the virtual machines and transferring the executable files or source code files to the virtual machine.

At Block 1220, the model is deployed. The model is deployed by generating a uniform resource locator for the model that is accessible to external processes.

At Block 1222, the model is accessed by external processes using a communication standard. Communication standards that may be used include representational state transfer (REST) and remote procedure call (e.g., gRPC). The model may be called by an external process to receive data, process the data, and then return results to the external process.

Turning to FIG. 13, the user interface (1300) displays the deployment view (1302). The deployment view includes the deployment list (1305) displayed in a table. The table includes the columns (1308), (1310), (1312), (1315), (1318), (1320), (1322), (1325), (1328), and (1330) and includes the rows (1332), (1335), (1338), (1340), (1342), and (1345).

The column (1308) displays run identifiers of the models represented in the deployment list (1305). The run identifiers disambiguate between different instances of the model that may be running on different systems for different users.

The column (1310) displays version identifiers of the models represented in the deployment list (1305). The version identifiers disambiguate between different versions of a model corresponding to a row of the deployment list (1305).

The column (1312) displays deployment statuses of the models. The deployment status of a model may be displayed with a text string, e.g., "Deployed", "Not Deployed", etc.

The columns (1315) through (1325) display model accuracy metrics. The model accuracy metrics include alpha in the column (1315), l1 rotation in the column (1318), mean absolute error (MAE) in the column (1320), r squared in the column (1322), and root mean squared error (RMSE) in the column (1325).

The column (1328) displays actions that may be taken for the models. Each action may be displayed with an icon that, when selected, performs the action. Actions that may be performed include deleting a model from the list (1305) and deploying a model.

The column (1330) deployment status is of the individual instances of the models listed in the deployment list (1305). The deployment status in the column (1330) may include a text description, an icon, and a link. The text descriptions ("In Progress", "Fail", "Pass", etc.) textually identify the status of deploying and instance of a model. The icons visually identify the status of deploying and instance of a model. The link provides a uniform resource locator (URL) that may be used to access the model to transmit data to the model and receive results from the model.

The rows (1332) through (1345) correspond to different deployment instances of a model. The same model may be executed with different run identifiers corresponding to different rows. For example, the rows (1332) and (1335) may correspond to the same model but use different run identifiers to disambiguate between the different instances.

Disclosed embodiments provide an architecture built with the combined strengths of leading technologies and inhouse components for creating a democratized AI environment fit for both domain experts and data scientists in the energy industry. The integrated architecture is provided in several steps. The integrated architecture starts with a data discovery module built using energy specific visualizations. Data transformation or feature selection is provided through a low code environment and storage in an enterprise feature store. Integration of models (which may be physical models) with machine learning (ML) modeling or modeling from data using partner led toolkits or open source integrated development environments (IDEs) is performed. Execution of the models through scalable clusters for ML training is performed, which may use a low code deployment environment (e.g., model operations (ModelOps)) to provide deployment capabilities on scalable clusters without having to be an expert of development operations (DevOps). The architecture also provides ability to capture metadata that helps in using application programming interfaces (APIs) as part of existing energy workflows or applications. API discovery is also provided to allow domain experts to use the system with a minimal understanding of representational state transfer (REST) APIs and make use of the system outputs. An integration further of business intelligence and energy specific visualizations with data science providing an innovative way of results visualization going beyond simple dashboards. Embodiments of the disclosed architecture are built to manage the big data produced in energy workflows while providing a combination of no-code, low-code, and high-code development as well as deployment environments fit for establishing better collaboration between domain experts and data scientists to quickly develop ML applications from ideation to commercialization.

Embodiments disclosed herein may be implemented on a computing system. Any combination of mobile, desktop, server, router, switch, embedded device, or other types of hardware may be used. For example, as shown in FIG. 14.1, the computing system (1400) may include one or more computer processors (1402), non-persistent storage (1404) (e.g., volatile memory, such as random access memory (RAM), cache memory), persistent storage (1406) (e.g., a hard disk, an optical drive such as a compact disk (CD) drive or digital versatile disk (DVD) drive, a flash memory, etc.), a communication interface (1412) (e.g., Bluetooth interface, infrared interface, network interface, optical interface, etc.), and numerous other elements and functionalities.

The computer processor(s) (1402) may be an integrated circuit for processing instructions. For example, the computer processor(s) may be one or more cores or micro-cores of a processor. The computing system (1400) may also include one or more input devices (1410), such as a touchscreen, keyboard, mouse, microphone, touchpad, electronic pen, or any other type of input device.

The communication interface (1412) may include an integrated circuit for connecting the computing system (1400) to a network (not shown) (e.g., a local area network (LAN), a wide area network (WAN) such as the Internet, mobile network, or any other type of network) and/or to another device, such as another computing device.

Further, the computing system (1400) may include one or more output devices (1408), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (1402), non-persistent storage (1404), and persistent storage (1406). Many different types of computing systems exist, and the aforementioned input and output device(s) may take other forms.

Software instructions in the form of computer readable program code to perform embodiments of the technology may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the technology.

The computing system (1400) in FIG. 14.1 may be connected to or be a part of a network. For example, as shown in FIG. 14.2, the network (1420) may include multiple nodes (e.g., node X (1422), node Y (1424)). Each node may correspond to a computing system, such as the computing system shown in FIG. 14.1, or a group of nodes combined may correspond to the computing system shown in FIG. 14.1. By way of an example, embodiments of the technology may be implemented on a node of a distributed system that is connected to other nodes. By way of another example, embodiments of the technology may be implemented on a distributed computing system having multiple nodes, where each portion of the technology may be located on a different node within the distributed computing system. Further, one or more elements of the aforementioned computing system (1400) may be located at a remote location and connected to the other elements over a network.

Although not shown in FIG. 14.2, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (1422), node Y (1424)) in the network (1420) may be configured to provide services for a client device (1426). For example, the nodes may be part of a cloud computing system. The nodes may include functionality to receive requests from the client device (1426) and transmit responses to the client device (1426). The client device (1426) may be a computing system, such as the computing system shown in FIG. 14.1. Further, the client device (1426) may include and/or perform all or a portion of one or more embodiments of the technology.

The computing system or group of computing systems described in FIGS. 14.1 and 14.2 may include functionality to perform a variety of operations disclosed herein. For example, the computing system(s) may perform communication between processes on the same or different systems. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process; or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data described in the present application, between processes without departing from the scope of the technology. The processes may be part of the same or different applications and may execute on the same or different computing systems.

Rather than or in addition to sharing data between processes, the computing system performing one or more embodiments of the technology may include functionality to receive data from a user. For example, a user may submit data via a graphical user interface (GUI) on the user device. Data may be submitted via the graphical user interface by a user selecting one or more graphical user interface widgets or inserting text and other data into graphical user interface widgets using a touchpad, a keyboard, a mouse, or any other input device. In response to selecting a particular item, information regarding the particular item may be obtained from persistent or non-persistent storage by the computer processor. Upon selection of the item by the user, the contents of the obtained data regarding the particular item may be displayed on the user device in response to the user's selection.

By way of another example, a request to obtain data regarding the particular item may be sent to a server operatively connected to the user device through a network. For example, the user may select a uniform resource locator (URL) link within a web client of the user device, thereby initiating a Hypertext Transfer Protocol (HTTP) or other protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from the server after selecting the URL link may provide a web page in Hyper Text Markup Language (HTML) that may be rendered by the web client and displayed on the user device.

Once data is obtained, such as by using techniques described above or from storage, the computing system, in performing one or more embodiments of the technology, may extract one or more data items from the obtained data. For example, the extraction may be performed as follows by the computing system in FIG. 14.1. First, the organizing pattern (e.g., grammar, schema, layout) of the data is determined, which may be based on one or more of the following: position (e.g., bit or column position, Nth token in a data stream, etc.), attribute (where the attribute is associated with one or more values), or a hierarchical/tree structure (consisting of layers of nodes at different levels of detail, such as in nested packet headers or nested document sections). Then, the raw, unprocessed stream of data symbols is parsed, in the context of the organizing pattern, into a stream (or layered structure) of tokens (where each token may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the token(s) associated with the node(s) matching the extraction criteria are extracted. The extraction criteria may be as simple as an identifier string or may be a query presented to a structured data repository (where the data repository may be organized according to a database schema or data format, such as XML).

The extracted data may be used for further processing by the computing system. For example, the computing system of FIG. 14.1, while performing one or more embodiments of the technology, may perform data comparison. Data comparison may be used to compare two or more data values (e.g., A, B). For example, one or more embodiments may determine whether A>B, A=B, A !=B, A<B, etc. The comparison may be performed by submitting A, B, and an opcode specifying an operation related to the comparison into an arithmetic logic unit (ALU) (i.e., circuitry that performs arithmetic and/or bitwise logical operations on the two data values). The ALU outputs the numerical result of the operation and/or one or more status flags related to the numerical result. For example, the status flags may indicate whether the numerical result is a positive number, a negative number, zero, etc. By selecting the proper opcode and then reading the numerical results and/or status flags, the comparison may be executed. For example, in order to determine if A>B, B may be subtracted from A (i.e., A−B), and the status flags may be read to determine if the result is positive (i.e., if A>B, then A−B>0). In one or more embodiments, B may be considered a threshold, and A is deemed to satisfy the threshold if A=B or if A>B, as determined using the ALU. In one or more embodiments of the technology, A and B may be vectors, and comparing A with B includes comparing the first element of vector A with the first element of vector B, the second element of vector A with the second element of vector B, etc. In one or more embodiments, if A and B are strings, the binary values of the strings may be compared.

The computing system in FIG. 14.1 may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g., join, full join, count, average, etc.), sort (e.g., ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The computing system of FIG. 14.1 may include functionality to present raw and/or processed data, such as results of comparisons and other processing. For example, presenting data may be accomplished through various presenting methods. Specifically, data may be presented through a user interface provided by a computing device. The user interface may include a GUI that displays information on a display device, such as a computer monitor or a touchscreen on a handheld computer device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

For example, a GUI may first obtain a notification from a software application requesting that a particular data object be presented within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be presented through various audio methods. In particular, data may be rendered into an audio format and presented as sound through one or more speakers operably connected to a computing device.

Data may also be presented to a user through haptic methods. For example, haptic methods may include vibrations or other physical signals generated by the computing system. For example, data may be presented to a user using a vibration generated by a handheld computer device with a predefined duration and intensity of the vibration to communicate the data.

The above description of functions presents a few examples of functions performed by the computing system of FIG. 14.1 and the nodes and/or client device in FIG. 14.2. Other functions may be performed using one or more embodiments of the technology.

Ordinal numbers (e.g., first, second, third, etc.) in the application may be used as an adjective for an element (i.e., any noun in the application). The use of ordinal numbers is not to imply or create any particular ordering of the elements nor to limit any element to be a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

While the technology has been described with respect to a limited number of embodiments, those skilled in the art, having benefit of this disclosure, will appreciate that other embodiments may be devised which do not depart from the scope as disclosed herein. Accordingly, the scope of the technology should be limited only by the attached claims.

What is claimed is:

1. A method comprising:
presenting a map on a graphical user interface;
presenting energy data at a geographical location on the map, wherein the energy data includes spatial coordinates of the energy data, the energy data selectable using the map;
based on a data selection of the energy data on the map, presenting a window overlaid over the map, the window including a plurality of machine learning models configured with deployment settings and configured to use the energy data, wherein the deployment settings identify sample features of the energy data;
based on a model selection of a machine learning model of the plurality of machine learning models at the window, authorizing access to the machine learning model and the energy data;
deploying the machine learning model using the deployment settings; and
presenting results generated from the sample features using the machine learning model, wherein the sample features are extracted from the energy data.

2. The method of claim 1, further comprising presenting a model lineage, wherein the model lineage identifies training steps and training data used to generate the machine learning model.

3. The method of claim 1, further comprising presenting a data lineage, wherein the data lineage identifies data sources and machine learning models used to generate the results.

4. The method of claim 1, further comprising periodically retraining the machine learning model.

5. The method of claim 1, further comprising registering the machine learning model with a publication service.

6. The method of claim 1, further comprising publishing the machine learning model subsequent to presenting the window.

7. The method of claim 1, further comprising deploying the machine learning model as a microservice.

8. The method of claim 1, further comprising executing the machine learning model to generate the results from the energy data.

9. The method of claim 1, further comprising presenting the results with a dashboard.

10. The method of claim 1, further comprising transmitting the results to a domain application.

11. The method of claim 1, wherein the map includes a geographic information system (GIS) map.

12. A system comprising:
a processor and memory, the memory including instructions that cause the processor to:
present a map on a graphical user interface;
present energy data at a geographical location on the map, wherein the energy data includes spatial coordinates of the energy data, the energy data selectable using the map;
based on a data selection of the energy data on the map, present a window overlaid over the map, the window including a plurality of machine learning models configured with deployment settings and configured to use the energy data, wherein the deployment settings identify sample features of the energy data;
based on a model selection of a machine learning model of the plurality of machine learning models at the window, authorize access to the machine learning model and the energy data;
deploy the machine learning model using the deployment settings; and
presenting results generated from the sample features using the machine learning model, wherein the sample features are extracted from the energy data.

13. The system of claim 12, wherein the instructions further cause the processor to present a model lineage, wherein the model lineage identifies training steps and training data used to generate the machine learning model.

14. The system of claim 12, wherein the instructions further cause the processor to present a data lineage, wherein the data lineage identifies data sources and machine learning models used to generate the results.

15. The system of claim 12, wherein the instructions further cause the processor to periodically retrain the machine learning model.

16. The system of claim 12, wherein the instructions further cause the processor to register the machine learning model with a publication service.

17. The system of claim 12, wherein the instructions further cause the processor to publish the machine learning model subsequent to presenting the window.

18. The system of claim 12, wherein the instructions further cause the processor to deploy the machine learning model as a microservice.

19. The system of claim 12, wherein the instructions further cause the processor to execute the machine learning model to generate the results from the energy data.

20. The system of claim 12, wherein the instructions further cause the processor to present the results with a dashboard.

* * * * *